US009820280B2

(12) United States Patent
Ellinikos et al.

(10) Patent No.: US 9,820,280 B2
(45) Date of Patent: Nov. 14, 2017

(54) OVERLAYING WIRELESS NETWORKS

(71) Applicant: T-Mobile USA, Inc., Bellevue, WA (US)

(72) Inventors: Michael Kosmas Ellinikos, Scarsdale, NY (US); Spencer Shungu Gawe, Randolph, NJ (US); Monserrat Dominguez Martinez, Hopewell Junction, NY (US)

(73) Assignee: T-Mobile USA, Inc., Bellevue, WA (US)

( * ) Notice: Subject to any disclaimer, the term of this patent is extended or adjusted under 35 U.S.C. 154(b) by 205 days.

(21) Appl. No.: 14/981,109

(22) Filed: Dec. 28, 2015

(65) Prior Publication Data

US 2017/0188363 A1 Jun. 29, 2017

(51) Int. Cl.
*H04W 24/00* (2009.01)
*H04W 72/04* (2009.01)
*H04W 72/08* (2009.01)

(52) U.S. Cl.
CPC ..... *H04W 72/0453* (2013.01); *H04W 72/085* (2013.01)

(58) Field of Classification Search
CPC .............. H04W 72/0453; H04W 72/085
(Continued)

(56) References Cited

U.S. PATENT DOCUMENTS 9,332,547 B1 * 5/2016 Ghavami .......... H04W 72/0453
9,729,221 B2 * 8/2017 Neuhaus ............. H04B 7/0626
(Continued)

FOREIGN PATENT DOCUMENTS

WO 2014169488 A1 10/2014
WO WO2015135780 9/2015
WO 2015143650 A1 10/2015

OTHER PUBLICATIONS

"3GPP TS 36.101 V11.0.0" 3rd Generation Partnership Project; Technical Specification Group Radio Access Network; Evolved Universal Terrestrial Radio Access (E-UTRA); User Equipment (UE) ration transmission and reception (Release 11), Apr. 2012, pp. 1-12, 20-21, 155-160.

(Continued)

*Primary Examiner* — Babar Sarwar
(74) *Attorney, Agent, or Firm* — Lee & Hayes, PLLC; Robert C. Peck; Christopher J. White

(57) ABSTRACT

In some implementations, a radio access provider, e.g., of a wireless telecommunications network, can receive, in a first frequency sub-band, control information of a first network. The provider can transmit, in a second sub-band, control information of a second network. The provider can transmit media information of the first network via first and second first-network channels in a third sub-band and transmit media information of the second network via a second-network channel arranged in frequency between the first and second first-network channels. In some implementations, the provider can select a first channel of the first network for first media; select a second channel of the second network for second media; select additional channels of the first network different in frequency from the second channel; and operate a first transceiver to wirelessly transmit the first media via the first channel and the additional channels.

17 Claims, 10 Drawing Sheets

(58) Field of Classification Search
USPC ............ 455/404.1, 412.1–414.2, 418–422.1, 455/435.3, 443, 444, 552.1, 436, 456.1, 455/456.2, 456.5, 456.6
See application file for complete search history.

(56) References Cited

U.S. PATENT DOCUMENTS

| | | | |
|---|---|---|---|
| 2004/0203815 A1* | 10/2004 | Shoemake | H04W 72/02 455/450 |
| 2009/0067403 A1* | 3/2009 | Chan | H04W 16/10 370/343 |
| 2009/0186621 A1* | 7/2009 | Umeda | H04L 1/0003 455/446 |
| 2011/0269502 A1* | 11/2011 | Clark | H04B 1/006 455/552.1 |
| 2012/0058728 A1* | 3/2012 | Wang | H04W 16/10 455/62 |
| 2013/0039296 A1* | 2/2013 | Damnjanovic | H04W 72/1289 370/329 |
| 2013/0178225 A1* | 7/2013 | Xing | H04W 16/14 455/454 |
| 2013/0308595 A1* | 11/2013 | Ratasuk | H04W 16/06 370/330 |
| 2014/0044000 A1* | 2/2014 | Charbit | H04W 16/14 370/252 |
| 2014/0064227 A1* | 3/2014 | Zhang | H04L 1/0006 370/329 |
| 2014/0066050 A1* | 3/2014 | Kotecha | H04W 88/06 455/422.1 |
| 2014/0233529 A1* | 8/2014 | Prakash | H04W 36/0022 370/331 |
| 2015/0071239 A1* | 3/2015 | Zhang | H04L 1/0006 370/329 |
| 2017/0070324 A1* | 3/2017 | Kahtava | H04L 5/0044 |

OTHER PUBLICATIONS

"3GPP TS 36.829 V11.0.0" 3rd Generation Partnership Project; Technical Specification Group Radio Access Network; Enhanced performance requirement for LTE User Equipment (UE) (Release 11), Apr. 2012, pp. 1-5, 8-12, 22, 11-43, 79-83.

Alfarhan, Faris, "An Evaluation of LTE Frequency Selective Scheduling," retrieved on Nov. 28, 2015 at <<http://frankrayal.com/2013/10/09/an-evaluation-of-lte-frequency-selective-scheduling/>>, Frank Rayal, published Oct. 9, 2013, pp. 1-4.

Hamalainen, Jyri, "Cellular Network Planning and Optimization Part V: GSM," Communications and Networking Department, Helsinki University of Technology, Jan. 18, 2008, pp. 1-32.

Sun, et al., "A Configurable Dual-Mode Algorithm on Delay-Aware Low-Computation Scheduling and Resource Allocation in LTE Downlink," 2012 IEEE Wireless Communications and Networking Conference: MAC and Cross-Layer Design, 2012, pp. 1444-1449.

PCT Search Report and Written Opinion dated Mar. 30, 2017 for PCT application No. PCT/US2016/066352, 11 pages.

* cited by examiner

OVERLAYING WIRELESS NETWORKS

BACKGROUND

Conventional wireless devices are designed to work or operate in a specified frequency range or band with limited transmit power levels. Government agencies, e.g., the U.S. Federal Communications Commission (FCC), license specific bands to specific network operators. The FCC limits transmit power for each of the licensed bands to provide public safety and to reduce potential co-band and adjacent band interference levels.

Example licensed frequency bands include cellular telephony or Personal Communication Service (PCS) bands, as well as Advanced Wireless Services (AWS) bands and Global System for Mobile Communications (GSM) bands. Cellular communications in the U.S. typically operate in the frequency ranges of 824-849 MHz, and 869-894 MHz. Further bands include 700 MHz bands, such as Band 12. Broadband PCS communications in the U.S. typically operate in the frequency ranges of 1850-1910 MHz and 1930-1990 MHz, while narrowband PCS typically operates in the frequency ranges of 901-902 MHz, 930-931 MHz, and 940-941 MHz. The 4940-4990 MHz band (referred to as the 4.9 GHz licensed band) is available but is designated by the FCC for support of public safety. Other licensed bands, such as those supporting Third Generation (3G) wireless communications, include frequency bands such as 1710-1755 MHz, 2110-2155 MHz, 2305-2320 MHz, 2345-2360 MHz (Wireless Communication Services, WCS band), and 2500-2690 MHz (Multichannel Multipoint Distribution Services, MMDS band).

Licensees to a licensed band usually have an exclusive right to provide services with the band in a specified geographic area, for a defined term and within specified times. The license is exclusive in the sense that no other service providers are typically allowed to provide services in the same band, in the same area and at the same time. Other licensed bands include, but are not limited to, a licensed band identified as allocated for Worldwide Interoperability for Microwave Access (WIMAX).

Many wireless networks provide communication services to multiple types or generations of devices. For example, a cellular network may provide connectivity to second-generation (2G) cellular devices using, e.g., the GSM standard, third-generation (3G) cellular devices using, e.g., the Universal Mobile Telecommunications System (UMTS) standard, or fourth-generation (4G) cellular networks using, e.g., the Long Term Evolution (LTE) standard. Within the any particular cell of such a network, cellular devices may be operating using multiple network types or standards. Moreover, a particular cellular device may switch between network types in operation, e.g., due to a circuit-switched (CS) fallback operation when leaving LTE coverage during a call but still within GSM coverage. Each network type may operate in a separate licensed band in any given cell.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
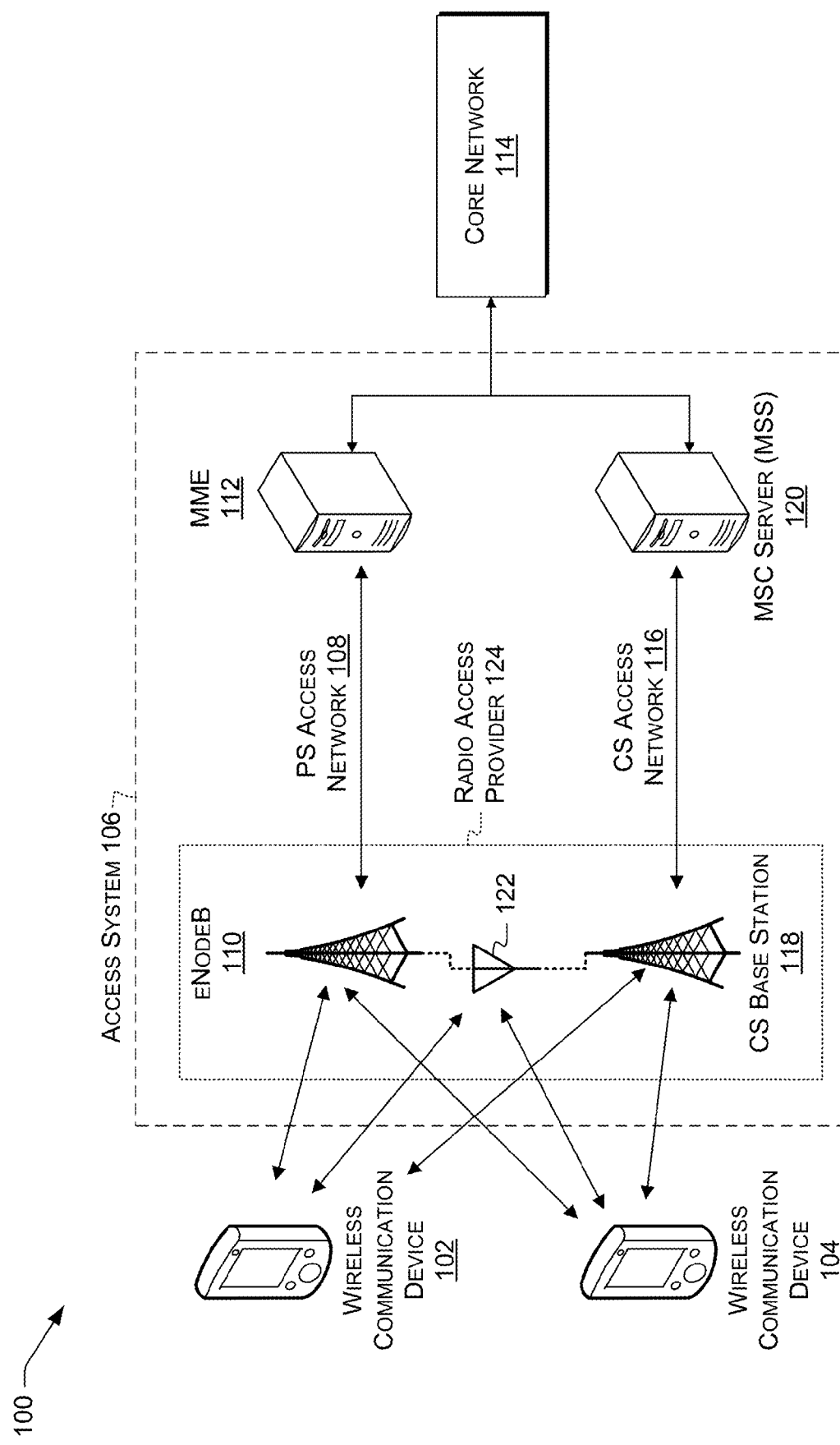
FIG. 1 illustrates an example telecommunications network, including components used to perform service-access control of a communication session.

The use of separate bands for separate network types often results in certain frequency bands being heavily utilized and other frequency bands being underutilized, depending on the mix of users present in a cell. Some example systems and techniques described herein permit making effective use of available network bandwidth by permitting network bandwidth to be used for communications on multiple types of networks. Some prior schemes require separate, type-specific bands for, e.g., GSM networks and LTE networks. Some examples herein permit operating both GSM and LTE, or other sets of networks of different types, within a single band. This can provide increased throughput to the network having higher utilization, while still permitting communications via the network having lower utilization. This permits serving users having, e.g., older wireless communication devices or devices not supporting fewer than all of the overlaid types of networks, e.g., GSM phones not capable of communicating via LTE. As used herein, utilization, e.g., as analyzed to determine channel allocations, can include measured utilization, predicted utilization, or any combination or hybrid thereof.

This disclosure describes, in part, a radio access provider configured to select blocks or channels from frequency bands for wireless communication devices. The radio access provider may select blocks or channels from multiple frequency bands for at least one of the wireless communication devices. Wireless communication devices, as used herein, can include communication or computing devices capable of wireless data or voice communication, including but not limited to via example types of networks described herein.

The terms "session" or "call" as used herein include a communications path for bidirectional exchange of data among two or more wireless communication devices. Example sessions include voice and video calls, e.g., by which human beings converse, a data communication session, e.g., between two electronic systems or between an electronic system and a human being, or a Rich Communication Suite (RCS, also known as JOYN) session.

Example networks carrying sessions include GSM and UMTS networks. Other example networks include LTE networks carrying voice-over-LTE (VoLTE) sessions using Session Initiation Protocol (SIP) signaling and data networks, such as Institute of Electrical and Electronics Engineers (IEEE) 802.11 (WIFI) networks carrying voice over Internet Protocol (VoIP) calls or other over-the-top (OTT) sessions encapsulating, e.g., voice or video data in a way transparent to an underlying packet transport. GSM is an example of a circuit-switched (CS) network; LTE and WIFI are examples of packet-switched (PS) networks.

As used herein, a "party" is a wireless communication device or a user employing a wireless communication device. Sessions can include the transfer of messages between parties. Systems and techniques herein can permit controlling bandwidth usage and security by controlling which capabilities can be used on particular communication sessions. In some examples, the control is facilitated transparently to the intercommunicating computing devices. In some examples, a radio access provider can receive, in a first frequency sub-band, control information of a first network having a first type; transmit, in a second, different frequency sub-band, control information of a second network having a second, different type; transmit media information of the first network via first and second first-network channels spaced apart in frequency within a third frequency sub-band; and transmit media information of the second network via a second-network channel arranged in frequency between the first and second first-network channels within the third frequency sub-band. Using multiple sub-bands as described herein can, e.g., increase user-data throughput of the first network while maintaining functionality of the second network.

Some prior schemes use dedicated spectrum, e.g., one band per network, with no overlap. Examples herein can provide more efficient use of bandwidth than those schemes. For example, GSM usage may decrease over time and LTE usage may increase over time. Some examples herein can permit automatically increasing the share of the band used by LTE as GSM demand drops, increasing efficiency of spectrum usage.

Some prior schemes overlap an LTE secondary carrier with GSM spectrum. However, the secondary carrier may be in a different band than an LTE primary carrier, so these schemes may require an additional transceiver, or a wider-bandwidth transceiver and antenna, in the wireless communication device to access the secondary channel. An additional transceiver can lead to reduced RF power-amplifier efficiency and, concomitantly, increased power consumption and reduced battery life. A wider-bandwidth antenna may be larger than a narrower-bandwidth antenna of equivalent performance, e.g., if the low edge of the wider bandwidth is below the low edge of the narrower bandwidth; increased size is not desirable for portable devices. Increasing the bandwidth of a transceiver may reduce antenna efficiency or power efficiency of RF components in the transceiver, reducing battery life of the wireless communication device.

Various examples herein, by contrast, permit overlapping two networks' communications within a single band so that only one transceiver is required in the wireless communication device, and so that communications can be performed using a smaller antenna. For example, in areas with 10 MHz of PCS spectrum, e.g., the A4 and A5 bands, instead of allocating LTE to the A4 band and GSM to the A5 band, LTE and GSM can be overlaid on the A4 and A5 bands concurrently. Thus no spectrum is solely reserved for GSM. Sharing spectrum between, e.g., GSM and LTE can increase spectral efficiency by permitting use of otherwise-unused portions of, e.g., GSM spectrum. Overlaying networks can increase throughput of, e.g., LTE transmissions. Overlaying can make more spectrum available for other uses, e.g., public-safety communications.

Overlaying networks can also permit more readily deploying new radio technologies or services. For example, a new modulation technique can be overlaid on an existing band rather than activated in a newly-assigned band. This can reduce the sometimes years-long wait to clear the band, i.e., to wait for the cessation of transmissions in the newly-assigned band by former operators or equipment in that band. Overlaying can also permit network equipment such as base stations or user equipment to be reprogrammed, e.g., software-defined radio (SDR) techniques, to supply or use new services or modulation techniques without requiring hardware changes. Moreover, many prior base station radios only support transmissions in a 20 MHz-wide band. Overlaying can permit deploying new services without the additional cost or power consumption of additional radios for new bands. Overlaying can permit older equipment, e.g., UEs, to continue functioning even while newer technology is being deployed. Overlaying can also permit new services to take advantage of any band-specific optimizations, e.g., in base station antenna placement or orientation.

ILLUSTRATIVE EMBODIMENTS

FIG. 1 illustrates an example telecommunications network 100. Wireless communication devices 102 and 104 communicate with access system 106 of the telecommunications network. Access system 106 can include a first access network of a first type, e.g., LTE. In this example, PS access network 108 includes an eNodeB 110, e.g., a 4G base station or other access point, that provides connectivity to the PS access network 108. A mobility management entity (MME) 112 of PS access network 108 carries traffic between the PS access network 108 and a core network 114. Core network 114 communicates with access system 106 and provides media-handling services, e.g., to route video or voice data or to maintain continuity of the communication session during handover of a communication session.

In this example, access system 106 includes a second access network of a second, different type, e.g., GSM. In this example, CS access network 116 includes a CS base station (BS) 118 that provides connectivity to the CS access network 116. A mobile switching center (MSC) server (MSS) 120 carries traffic between the CS access network 116 and the core network 114. Each of the first access network and the second access network can be configured to selectively carry a communication session of wireless communication devices 102 or 104. For example, voice calls can be carried over the first access network using VoLTE and over the second access network using GSM. Example network types can include at least LTE time-division duplexed, LTE frequency-division duplexed, or GSM.

In some examples, each access network 108 or 116 may include its own radios and antennas. For example, eNodeB 110 and CS BS 118 may include respective, different antennas, or respective, different radios. Moreover, eNodeB 110 and CS BS 118 may operate in respective, different bands or in a common band. In some examples, eNodeB 110 and CS BS 118 may share a common antenna 122. For example, eNodeB 110 and CS BS 118 may be colocated at a single cell site, configured to operate in a common band, and connected to common antenna 122 to communicate with wireless communication device 102 or 104. In some examples using common antenna 122, a common ("twin") tower-mounted amplifier (TMA) can be used for both the first network and the second network, or respective TMAs can be used. The transmit powers of the radios can be adjusted, e.g., to provide selective regions of coverage.

In some examples, a radio access provider 124 can include at least eNodeB 110, CS BS 118. Radio access provider 124 can include common antenna 122 or respective antennas for eNodeB 110 and CS BS 118. For example, radio access provider 124 can be located at a cell site to provide radio access and communication services in a cell area to wireless communication devices using two or more different networks. Further details of radio access provider 124 are discussed below with reference to at least FIGS. 2 and 3.

The core network 114 of the telecommunications network may include a number of nodes, omitted for brevity. For example, the core network 114 may be a GPRS core network or an evolved packet core (EPC) network, or may include elements from both types of core networks. In some examples in which core network 114 includes an Internet Protocol (IP) Multimedia Subsystem (IMS), such nodes can include a proxy call session control function (P-CSCF), a home location register (HLR)/home subscriber server (HSS), an interrogating call session control function (I-CSCF), a serving call session control function (S-CSCF), an application server (AS), e.g., a telephony AS (TAS), a presence server, or an authorization server such as an equipment identity register (EIR), an enhanced EIR (EEIR), a Domain Name System (DNS) server, or an E.164 Number Mapping (ENUM) server.

The telecommunications network may also include a number of devices or nodes not illustrated in FIG. 1. Such devices or nodes may include an access transfer control function (ATCF), an access transfer gateway (ATGW), a visitor location register (VLR), a serving general packet radio service (GPRS) support node (SGSN), a gateway GPRS support node (GGSN), a policy control rules function (PCRF) node, a serving gateway (S-GW), a session border controller (SBC), or a media gateway.

The telecommunications network may provide a variety of services to wireless communication device 102, such as synchronous communication routing across a public switched telephone network (PSTN). Further services may include call control, switching, authentication, billing, etc. Furthermore, the devices and networks of FIG. 1 may cooperate to accomplish network overlay, e.g., as described herein.

Figure 2:
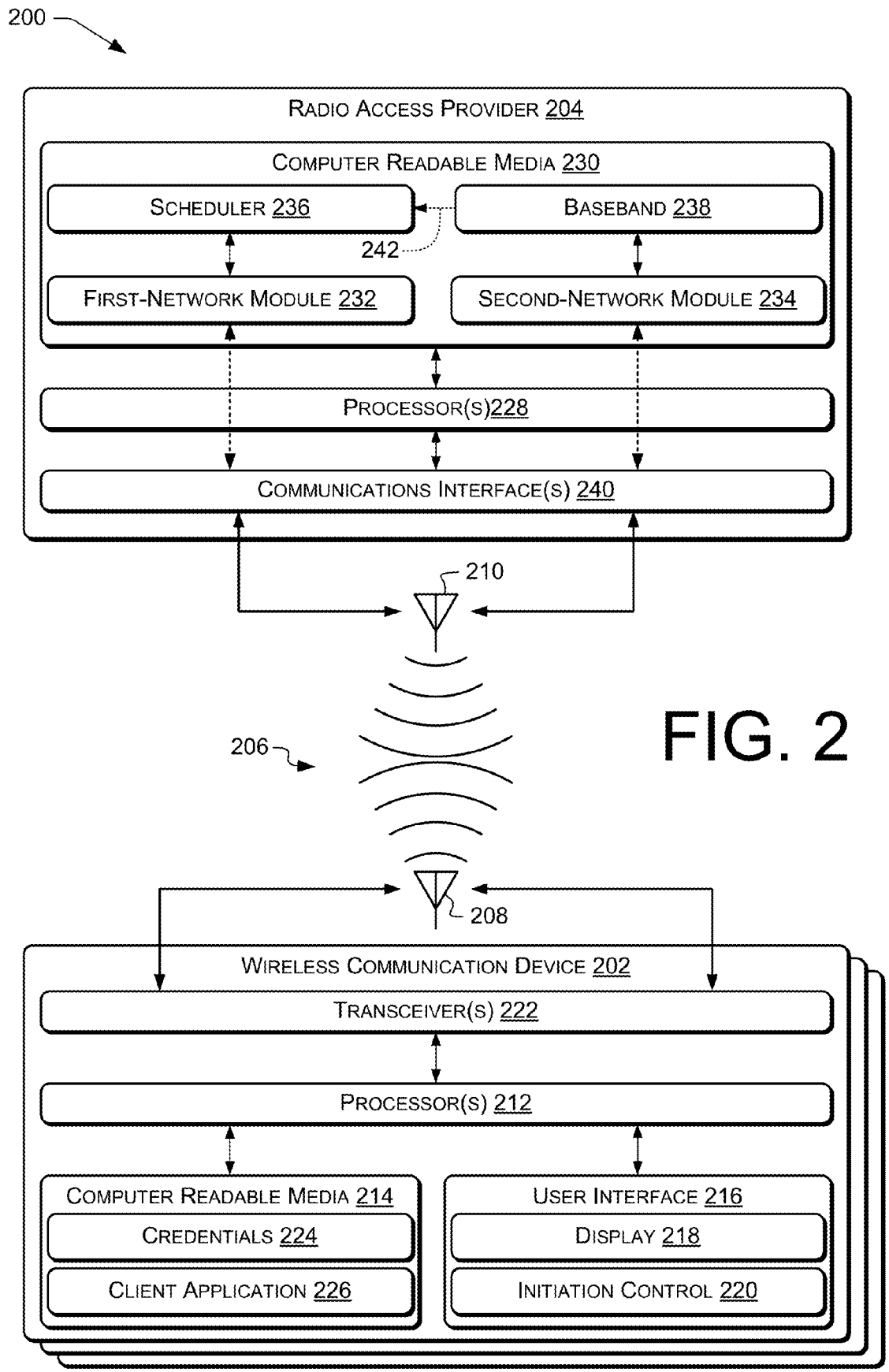
FIG. 2 is a block diagram illustrating a system for implementing service-access control according to some implementations.

FIG. 2 is a block diagram illustrating a system 200 permitting network overlay according to some implementations. The system 200 includes wireless communication device(s), individually or collectively referred to herein with reference 202, e.g., wireless phone(s) or other wireless-capable computing devices. Wireless communication device 202 is coupled to a radio access provider 204 via wireless connection 206. Wireless connection 206 can be accessed, e.g., via one or more antennas 208 of wireless communication device 202 and one or more antennas 210 of radio access provider 204. The radio access provider 204 can represent radio access provider 124, FIG. 1.

The wireless connection 206 can include transmissions of one or more networks operated substantially simultaneously in a particular frequency (wavelength) band, such as a PS network and a CS network overlaid in a 10 MHz-wide band. Example networks include LTE, WIFI, GSM Enhanced Data GSM Environment (EDGE) Radio Access Network (GERAN), UMTS Terrestrial Radio Access Network (UTRAN), and other cellular access networks. Network overly as described herein can be performed, e.g., for 2G, 3G, 4G, WIFI, or other networks.

Communications between the radio access provider 204 and computing devices such as the wireless communication device 202 can be performed via wide-area wireless coverage using a technology such as GSM, Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDMA), General Packet Radio Service (GPRS), EDGE, Advanced Mobile Phone System (AMPS), High Speed Packet Access (HSPA), evolved HSPA (HSPA+), VoIP, VoLTE, IEEE 802.1x protocols, WIMAX, WIFI, and/or any future IP-based network technology or evolution of an existing IP-based network technology. Communications between the radio access provider 204 and computing devices such as the wireless communication device 202 can additionally or alternatively be performed using other technologies, such as wired (Plain Old Telephone Service, POTS, or public switched telephone network, PSTN, lines), optical (e.g., Synchronous Optical NETwork, SONET) technologies, and the like. In some examples, multiple wireless communication devices 202 can be concurrently connected with radio access provider 204 via wireless connection 206. In some of these examples, each of the multiple wireless communication devices 202 can be connected via one of the networks (e.g., networks 108, 116, FIG. 1).

In some examples, the radio access provider 204 includes or is communicatively connected with an interworking function (IWF) or other device bridging networks, e.g., LTE, third-generation cellular (3G), and POTS networks. In some examples, the radio access provider 204 can bridge Signaling System #7 (SS7) traffic from the PSTN into the wireless connection 206, e.g., permitting PSTN customers to place calls to cellular customers and vice versa.

The wireless communication device 202 can be or include a wireless phone (e.g., a smartphone), a wired phone, a tablet computer, a laptop computer, a wristwatch, a portable digital assistant (PDA), a wearable computer (e.g., electronic/smart glasses, a smart watch, fitness trackers, etc.), a networked digital camera, or another type of computing device. The wireless communication device 202 can be configured to be generally mobile, e.g., a smartphone, or generally stationary, e.g., a television, desktop computer, game console, set top box, or the like. The wireless communication device 202 can include one or more processors 212, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs), and one or more computer readable media 214, such as memory (e.g., random access memory (RAM), solid state drives (SSDs), or the like), disk drives (e.g., platter-based hard drives), another type of computer-readable media, or any combination thereof. The wireless communication device 202 can further include a user interface (UI) 216, e.g., including an electronic display device 218, a speaker, a vibration unit, a touchscreen, or other devices for presenting information to a user and receiving commands from the user. The user interface 216 can include a session-initiating user interface control 220, e.g., a touchscreen button, to indicate a communication session should be initiated. The user interface 216 or components thereof, e.g., the display 218, can be separate from the wireless communication device 202 or integrated (e.g., as illustrated in FIG. 1) with the wireless communication device 202. The wireless communication device 202 can further include one or more transceiver(s) 222 configured to selectively communicate wirelessly via the wireless connection 206, e.g., via access system 106.

The computer readable media 214 can be used to store data and to store instructions that are executable by the processors 212 to perform various functions as described herein. The computer readable media 214 can store various types of instructions and data, such as an operating system, device drivers, etc. The processor-executable instructions can be executed by the processors 212 to perform the various functions described herein.

The computer readable media 214 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processors 212. Tangible computer-readable media can include volatile and nonvolatile, removable and non-removable media implemented in any method or technology for storage of information, such as computer readable instructions, data structures, program modules, or other data.

The computer readable media 214 can store credentials 224 used for access, e.g., to a GSM or LTE network. The credentials 224 can be stored, e.g., on a Subscriber Identity Module (SIM) card or on a read-only memory of wireless communication device 202. The credentials 224 may include, for example, an international mobile subscriber identity (IMSI) or international mobile equipment identifier (IMEI).

The computer readable media 214 can include processor-executable instructions of a client application 226. The client application 226, e.g., a native or other dialer, can permit a user to originate and terminate communication sessions associated with the wireless communication device 202, e.g., a wireless phone. The client application 226 can additionally or alternatively include a short message service (SMS), RCS, or presence client, or a client of another telephony service offered by the radio access provider 204 or the core network 114. In some examples, the client application 226 can determine parameters of the wireless communication device 202 such as power or signal strength, e.g., as discussed below with reference to FIG. 3.

The radio access provider 204 can include one or more processors 228 and one or more computer readable media 230. The computer readable media 230 can be used to store processor-executable instructions of first-network module 232, a second-network module 234, a first-network allocator 236, referred to herein as a "scheduler," e.g., an LTE scheduler, or a second-network allocator 238, referred to herein as a "baseband," e.g., a GSM baseband or modem function. Scheduler 236 and baseband 238 can be referred to collectively as "allocators." The processor-executable instructions can be executed by the processors 228 to perform various functions described herein. Other modules can be present in computer readable media 230. The use of the terms "allocator," "scheduler," or "baseband" does not require that any functions be performed that are not described herein. For example, baseband 238 can include allocation functions but not coding functions.

In some examples, radio access provider 204 can communicate with wireless communication device 202 or other devices via one or more communications interface(s) 240, e.g., network transceivers for wired or wireless networks, or memory interfaces. Example communications interface(s) 240 can include ETHERNET or FIBRE CHANNEL transceivers, WIFI radios, or DDR memory-bus controllers (e.g., for DMA transfers to a network card installed in a physical radio access provider 204).

In some examples, first-network module 232 can be configured to transmit or receive control or media information of a first network, e.g., PS access network 108. For example, first-network module 232 can be configured to encode or modulate transmitted data, or demodulate or decode received data. As indicated by the dashed arrow, first-network module 232 can operate or cooperate with communications interface(s) 240 to perform these functions. In an example, first-network module 232 can include an LTE engine configured to bridge communications between wireless communication device 202 and an IP-based packet data network such as core network 114, FIG. 1.

In some examples, second-network module 234 can be configured to transmit or receive control or media information of a second network, e.g., CS access network 116. For example, second-network module 234 can be configured to encode or modulate transmitted data, or demodulate or decode received data. As indicated by the dashed arrow, second-network module 234 can operate or cooperate with communications interface(s) 240 to perform these functions. In an example, second-network module 234 can include a GSM engine configured to bridge circuit-switched communications between wireless communication device 202 and a GSM core network (omitted for brevity).

In some examples, scheduler 236 can be configured to allocate, assign, or otherwise select channels, frequency sub-bands, or other radio-frequency (RF) resources to transmissions of the first network, e.g., network 108, FIG. 1. Scheduler 236 can divide the RF resources by time (e.g., time-division duplexing, TDD or time-division multiplexing, TDM), frequency (e.g., frequency-division duplexing, FDD or frequency-division multiplexing, FDM), or a combination thereof (e.g., LTE FDD, which performs FDD within consecutive timeslots). Examples of the operation of scheduler 236 are discussed below, e.g., with reference to FIGS. 3-10.

In some examples, baseband 238 can be configured to allocate, assign, or otherwise select channels, frequency sub-bands, or other radio-frequency (RF) resources to transmissions of the second network, e.g., network 116, FIG. 1. Baseband 238 can divide the RF resources by time (e.g., TDD or TDM), frequency (e.g., FDD or FDM), or a combination thereof (e.g., GSM allocation, which allocates timeslots on individual carriers). Examples of the operation of baseband 238 are discussed below, e.g., with reference to FIGS. 3-10.

In some examples, as graphically indicated by link 242, scheduler 236 can receive information from or about baseband 238. In some examples, scheduler 236 can detect signals in frequency bands of interest and select first-network channels that do not have such signals (e.g., first-network channels that have signal quality metrics that meet selected criteria, and likewise throughout). In some examples, baseband 238 can provide scheduler 236 information of which second-network channels are currently in use. Scheduler 236, using the detected signals or received information, can select first-network channels that are not used by the second network. This can reduce interference between the networks and maintain network performance.

In some examples, baseband 238 can detect signals in frequency bands of interest and select second-network channels that do not have such signals. For example, a GSM baseband can be configured to select traffic channels (TCHs) from a group of channels that use frequencies which are solely reserved for TCHs and fall back to a group of channels that share a frequency with broadcast control channels (BCCHs) if call quality does not meet selected criteria (e.g., because of first-network transmissions), or vice versa. In such configurations, link 242 can include bidirectional exchange, e.g., by detection of signals or bidirectional exchange of information about channel usage.

Figure 3:
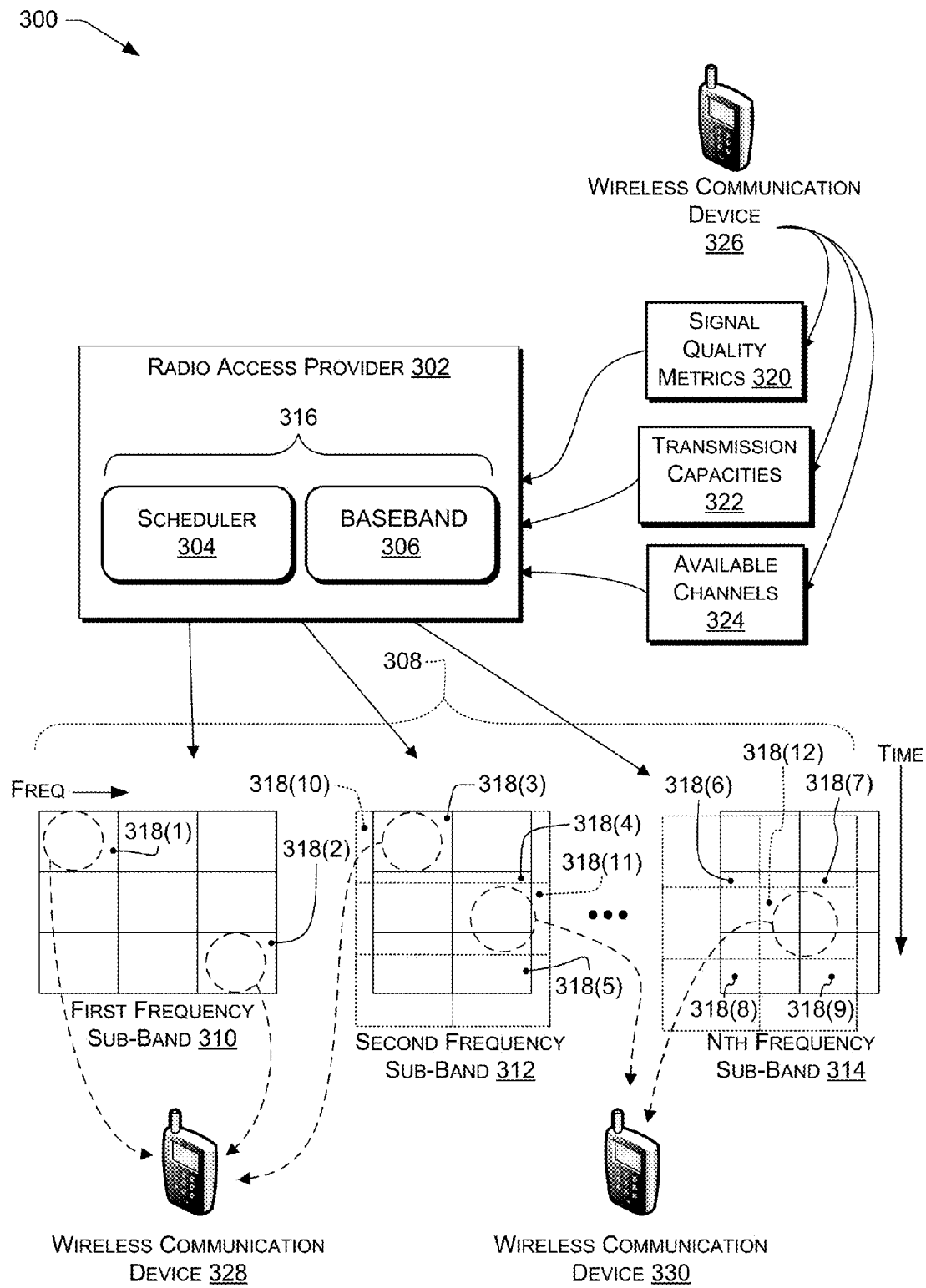
FIG. 3 illustrates an overview of a radio access provider configured to select blocks or channels from one or more frequency bands for wireless communication devices.

FIG. 3 illustrates an example 300 of operation of radio access provider 302, which can represent radio access provider 124 or 204. For example, radio access provider 302 can be, include, or be embodied in a base station for a wireless communications network, e.g., a cellular network. Radio access provider 302 can be configured to perform operations described herein, e.g., with reference to FIGS. 3-10. For example, radio access provider 302 can be configured to select channels, e.g., blocks, sub-bands, timeslices, or other assignable units, from one or more frequency bands for wireless communication devices. As used herein, the term "channel" is not restricted to the usage of the word "channel" in any particular network specification.

In some examples, radio access provider 302 can include a first radio and a second, different radio, e.g., radios of eNodeB 110 and CS BS 118, FIG. 1. The first radio and the second radio can be tuned to operate within a common frequency band. The first radio and the second radio can be communicatively connected with a processor 228. In some examples, radio access provider 302 can include one or more communications interface(s) 240 coupled to a processor 228 and configured to send and receive transmissions over one or more frequency bands. In some examples, radio access provider 302 can include one or more antennas connected to at least the first radio or the second radio, e.g., individual antennas of eNodeB 110 and CS BS 118, or common antenna 122, all FIG. 1.

In various implementations, the radio access provider 302 may comprise any one or more base stations, nodeBs, eNodeBs, or wireless access points (e.g., WIFI access points, WIMAX access points, etc.). The radio access provider 302 may include components fixing the radio access provider 302 to a location or positioning the radio access provider 302 at that location, such as components of a cell tower. The radio access provider 302 may also support one or more cells of varying sizes, such as macrocells, microcells, picocells, femtocells, or other small cells, of one or more access networks of a telecommunication network. To provide wireless connectivity to the telecommunication network, the radio access provider 302 may be equipped with any number of components, such as radio antennas, transmitter components, receiver components, power amplifiers, combiners, duplexers, encoder components, decoder components, band pass filters, power sources, or control components, such as scheduler 304 or baseband 306 (discussed in greater detail below). The radio access provider 302 may also be or include one or more computing devices, such as a server or server farm, multiple, distributed server farms, a mainframe, a work station, a personal computer (PC), a laptop computer, a tablet computer, an embedded system, or any other sort of device or devices.

As illustrated, a scheduler 304 or a baseband 306 of or associated with radio access provider 302 can allocate access to sub-bands of a frequency band 308. Scheduler 304 may represent scheduler 236, FIG. 2. Baseband 306 may represent baseband 238, FIG. 2. In the illustrated example, frequency band 308 includes a first frequency sub-band 310, a second frequency sub-band 312, and an Nth frequency sub-band 314. For brevity, references to "bands" herein may include sub-bands. Also for brevity, allocator 316 is shown including scheduler 304 and baseband 306. References to functions of allocator 316 herein refer to scheduler 304, for the first network, or baseband 306, for the second network, unless otherwise expressly stated.

Each frequency band may include multiple resource blocks (alternatively referred to herein as "blocks" or "RBs") or channels which may be assigned by the allocator 316 to wireless communication devices 326 for downlink communications, uplink communications, or both. In the illustrated example, sub-bands 310-314 are divided into RBs 318(1)-318(12), individually or collectively referred to herein with reference 318 (any number of RBs 318 can be used). In sub-band 308, as shown in FIG. 3, time increases down the page and frequency increases from left to right. The illustrated example frequency sub-band 308 is divided into RBs 318 in both the time and frequency dimensions. Allocator 316 can select channels, e.g., blocks or subcarriers, based at least in part on, e.g., based on any or all of service priorities, signal quality metrics, power capacities, available unlicensed channels, or cross-correlations. In some example, reference symbols, control information, or media information (e.g., voice-call data) can be distributed throughout each RB 318 or sub-band 310-314 in a regular pattern.

In some examples, an RB is an LTE physical resource block (PRB), 12 subcarriers wide and one slot (0.5 ms; 7 OFDMA symbols) in duration. LTE PRBs are arranged into subframes, pairs of consecutive slots, and frames, sequences of 10 consecutive subframes. FIG. 3 shows, in solid lines, an example regular pattern of LTE RBs, including RBs 318(1) and 318(2) in first frequency sub-band 310, 318(3)-318(5) in second frequency sub-band 312, and 318(6)-318(9) in Nth frequency sub-band 314.

In some examples, an RB is a GSM subcarrier, frame, or timeslot. GSM subcarriers are spaced 200 kHz apart, and each timeslot has a duration of 0.5765 ms. A frame of eight timeslots has a duration of 4.615 ms. One timeslot per frame provides at least 9.6 kbit/s of data, sufficient for a voice call. FIG. 3 shows, in short-dashed lines, an example regular pattern of GSM RBs, including RBs 318(10) and 318(11) in second frequency sub-band 312, and 318(12) in Nth frequency sub-band 314.

In the illustrated example of second frequency sub-band 312, GSM RBs 318 share bounds with LTE RBs 318. For example, LTE RB 318(3) and GSM RB 318(10) share the same upper frequency (right edge) and start time (top edge). In the illustrated example of Nth frequency sub-band 314, GSM RBs 318 do not share bounds with LTE RBs 318. First-network RBs 318 can share none, some, or all bounds (e.g., in time or frequency) with second-network RBs 318.

In some examples, the radio access provider 302 may transmit and receive over multiple frequency bands.

Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WIMAX frequency band. The frequency band 308 may each be any of the example frequency bands. In an example, e.g., of operation in a 1900 MHz frequency band, a 10 MHz band allocation (e.g., 10 MHz each for uplink and downlink) can be shared by two overlaid networks, rather than divided into two 5 MHz allocations for individual networks.

In some examples, allocator 316 can, e.g., receive signal quality metrics 320 for the frequency sub-bands 310-314, e.g., by measuring signals or by receiving information as discussed above with reference to link 242, FIG. 2. Further, allocator 316 may receive indications of transmission capacities 322 and available channels 324. The signal quality metrics 320, transmission capacities 322, and available channels 324 may be received from wireless communication devices 326, and service priorities may be associated with active applications of the wireless communication devices 326. Further, the allocator 316 may also receive service priorities for uplink traffic from the wireless communication devices 326. The allocator 316 may select blocks or channels of the frequency sub-bands 310-314 for the wireless communication devices 326. For example, the allocator 316 may select two blocks from the first frequency sub-band 310 and one block from the second frequency sub-band 312 for a wireless communication device 328, e.g., an LTE phone, and two blocks for a wireless communication device 330, e.g., a GSM phone, including one block from each of the second frequency sub-band 312 and the Nth frequency sub-band 314. References herein to wireless communication device 326 can include wireless communication devices 328 or 330 unless expressly indicated otherwise.

In some examples, the wireless communication devices 326 may be configured to determine, e.g., on a periodic basis, a list of blocks, channels, or frequency sub-bands by, for instance, receiving reference signals over those frequency sub-bands from the radio access provider 302. For each of these blocks, channels, or signals, the wireless communication devices 326 may determine a signal quality metric 320 and may compare the determined signal quality metrics to one or more thresholds. The wireless communication devices 326 may then notify, via an uplink connection, the radio access provider 302 of those blocks, channels, or frequency sub-bands which meet or exceed the threshold (s) and may provide the signal quality metrics 320 associated with those blocks, channels, or frequency sub-bands to the radio access provider 302. The wireless communication devices 326 may also calculate averages or medians of the signal quality metrics 320 of the available frequency sub-bands and may report the averages or medians to the radio access provider 302.

In some implementations, the wireless communication devices 326 may also take into account their own available power resources and power demands associated with transmission over different frequency sub-bands. The wireless communication devices 326 may receive indications of the power demands from the radio access provider 302 or from a previous radio access provider, which may in turn receive the power demands from the telecommunication network. Alternatively, the wireless communication devices 326 may be configured to attempt transmission on various frequency sub-bands and to record power demands associated with those transmissions. The wireless communication devices 326 may also receive or retrieve power metric from, e.g., power monitors. The power metrics may be indicative of power available to the wireless communication devices 326. Using its power metric and power demands, a wireless communication device 326 can determine a subset of the available frequency sub-bands (e.g., those frequency sub-bands with signal quality metrics 320 meeting or exceeding a threshold). For example, frequency sub-bands 310-314 may each be available, but the wireless communication device 328 may not have sufficient power to transmit over the Nth frequency sub-band 314. In such an example, the wireless communication device 328 may determine a subset including the frequency sub-bands 310-312 and may indicate to the radio access provider 302 that frequency sub-bands 310-312 are available. In another example, the wireless communication device 328 may have power to transmit over any two of the frequency sub-bands 310-314, but not all three. In such an example, the wireless communication device 328 may indicate the alternative subsets to the radio access provider as the transmission capacities 322.

Alternatively, the wireless communication devices 326 may rely on the radio access provider 302 to consider the power available to the wireless communication device 326 and may each provide its power metric and, optionally, power demands, to the radio access provider as transmission capacities 322. The radio access provider 302 may then use those transmission capacities and signal quality metrics 320 to determine the frequency sub-bands available to the wireless communication devices 326.

In various implementations, upon receiving any or all of the service priorities, the signal quality metrics 320, the transmission capacities 322, or the available channels 324, the radio access provider 302 may provide that information to its allocator 316 to select blocks or channels from one or more of the frequency sub-bands 310-314 for radio communication links with the wireless communication devices 326. The allocator 316 may repeat selecting blocks or channels at each transmission time interval (TTI) and may select blocks or channels for both uplink and downlink communications. The allocator 316 may coordinate selection with other radio access providers 302 within radio range to reduce contention or interference between radio access providers 302. The allocator 316 may select blocks or channels for downlink communications with wireless communication devices 326 before selecting any blocks or channels for uplink communications or may select blocks or channels for both uplink and downlink communications with a wireless communication device 326 before selecting blocks or channels for another wireless communication device 326. The allocator 316 may select blocks or channels, e.g., using a round-robin scheduling algorithm, or using scheduling algorithm(s) that give priority to particular wireless communication device(s) 326, e.g., based on the signal quality metrics 320, the transmission capacities 322, the available UE power, or the available channels 324 meeting selected criteria. For example, higher priority may be given to wireless communication devices 326 with the highest signal quality metrics 320, since those users are likely to be near towers and expect effective, high-speed service, and also to wireless communication devices 326 with the highest signal quality metrics 320, since those users are likely to be near the edge of cell coverage and need additional channels to maintain communications.

In FIG. 3, the allocator 316, e.g., the scheduler 304, selects RBs 318(1) and 318(2) from the first frequency sub-band 310, and RB 318(3) from the second frequency sub-band 312, for a wireless communication device 328, e.g., an LTE phone. The allocator 316, e.g., the baseband 306, selects RB 318(11) from the second frequency sub-band 312 and RB 318(12) from the Nth frequency sub-band 314 for a wireless communication device 330, e.g., a GSM phone. Selections of RBs are graphically represented by circles.

In the illustrated example, first frequency sub-band 310 is dedicated to the first network (solid grid). Allocator 316 can assign RBs 318 within first frequency sub-band 310 without concern for interference from the second network. However, second frequency sub-band 312 and Nth frequency sub-band 314 are shared between the first network (solid grid) and the second network (short-dashed grid). For example, first-network transmissions in RB 318(3) can appear as interference in second-network RB 318(10). In another example, first-network transmissions in RB 318(4) can appear as interference in second-network RB 318(11). In still another example, second-network transmissions in RB 318(11) can appear as interference in second-network RBs 318(4) and 318(5). In yet another example, second-network transmissions in RB 318(12) can appear as interference in second-network RBs 318(6)-318(9). The allocator 316 for one of the networks, e.g., scheduler 304 or baseband 306, can detect or receive information about usage of the other one of the networks, and automatically select, e.g., unoccupied channels or channels with low instantaneous usage or low usage over time.

In some examples, at each new TTI, the allocator 316 may first group the wireless communication devices 326 by service priority and may select blocks or channels for radio communication links with all wireless communication devices 326 of a given service priority (e.g., a higher service priority) before selecting blocks or channels for radio communication links with any wireless communication devices 326 of other service priorities (e.g., lower service priorities). Within each service priority group, the allocator 316 may order the wireless communication devices 326 within that group based on average or media signal quality metrics 320. For example, if the signal quality metrics 320 for a wireless communication device 326 include channel quality indicators (CQIs), e.g., from 1-15, for three frequency sub-bands, the allocator 316 may calculate an average or median of those CQI (or, as discussed above, the allocator 316 may receive the average/median from the wireless communication device 326). The allocator 316 may order the wireless communication devices 326 from a wireless communication device 326 with a weakest average or median signal quality metric to a wireless communication device 326 with a strongest average or median signal quality metric. The allocator 316 may then select blocks or channels for wireless communication devices 326 based on that order.

When selecting blocks or channels for a wireless communication device 326, the allocator 316 may utilize a cost-function which takes into account the available, unassigned blocks or channels, frequency sub-bands available to wireless communication device 326, as well as coding and modulation, transmission modes, transmission scenarios (e.g., multiband multiplexing, frequency diversity, frequency hopping, band hopping and a variety of combinations of these and other transmission scenarios), cross-correlation scores, and any guaranteed bit rate, quality-of-service (QoS), delay, or jitter requirements for the active application or user of the wireless communication device 326. Utilizing this information, the allocator 316 may select blocks or channels from a single frequency band (or sub-band, and likewise throughout this paragraph) or from multiple frequency bands. If multiple frequency bands, the multiple frequency bands may include frequency bands with high path loss and low path loss or both licensed and unlicensed frequency bands. In some examples, allocator 316 can use a gradient-descent algorithm to determine frequency assignments that mathematically minimize the cost function for some or all wireless communication devices 326 connected to radio access provider 302.

The cost function can additionally or alternatively consider usage by wireless communication devices 326 operating on two or more different types of networks. For example, the cost function can assign a high cost to simultaneous or near-simultaneous usage of a particular frequency sub-band by both LTE and GSM. The cost function can additionally or alternatively consider interactions between two or more different types of networks. For example, the cost function can assign a high or infinite cost to data transmissions that overlap control transmissions. For example, an infinite cost may be assigned to GSM transmissions overlapping the LTE physical uplink control channel (PUCCH). This will cause GSM transmissions to be assigned to blocks that do not overlap the PUCCH, e.g., as discussed below with reference to FIG. 4. Similarly, a high cost may be assigned to LTE transmissions that overlap the GSM broadcast control channel (BCCH). This will tend to result in LTE transmissions being assigned to blocks that do not overlap the BCCH, e.g., as discussed below with reference to FIG. 4, unless alternative assignments are higher cost.

The cost function can additionally or alternatively consider proximity of usage of different networks. For example, the cost function can assign a cost to each pair of a first-network channel and a second-network channel, and the cost can be inversely proportional to the distance between the channels in frequency space. This will tend to result in first-network channels being spaced apart from second-network channels. This will also permit interspersing first-network channels and second-network channels within a band, improving efficiency of usage of that band compared to allocating separate, spaced-apart bands for each network.

In various implementations, the allocator 316 may receive identifications of multiple alternative subsets of available frequency bands or sub-bands for a wireless communication device 326 (e.g., in the form of transmission capacities 322). Alternatively, the allocator 316 (or another component of the radio access provider 302) may utilize any power metric, power demands, and signal quality metrics 320 for a wireless communication device 326 to determine multiple alternative subsets. The allocator 316 may then utilize these received or determined multiple alternative subsets with the cost function and the other above-mentioned inputs to the cost function to select blocks or channels for a wireless communication device 326. The allocator 316 may utilize the alternative subsets when selecting blocks or channels for uplink communication with the wireless communication device 326. Because power may not be as much of a concern for downlink communications, more frequency bands or sub-bands may be available for downlink communications than for uplink communications.

In further embodiments, the allocator 316 may further utilize the identifications of available channels 324 for a wireless communication device 326 and select some or all of these channels for uplink communication with the wireless communication device 326. Based on the selected channels, the radio access provider 302 may utilize beam-forming for receiving (or transmitting if used for downlink) communications over that/those selected channel(s). The allocator 316 or other radio access provider component may also determine a transmit power to be used for the selected channel(s) and notify the wireless communication device 326 of both the selection of the channel(s) and the determined transmit power. Also, in some implementations, the allocator 316 may select a group of the channel(s) for the uplink communication and both the radio access provider 302 and the wireless communication device 326 may perform channel hopping among the selected group of channels in either a pre-set or random hopping pattern. Also, in some implementations, the allocator 316 may select a same channel or channels for both uplink and downlink communication with a wireless communication device 326.

Figure 4:
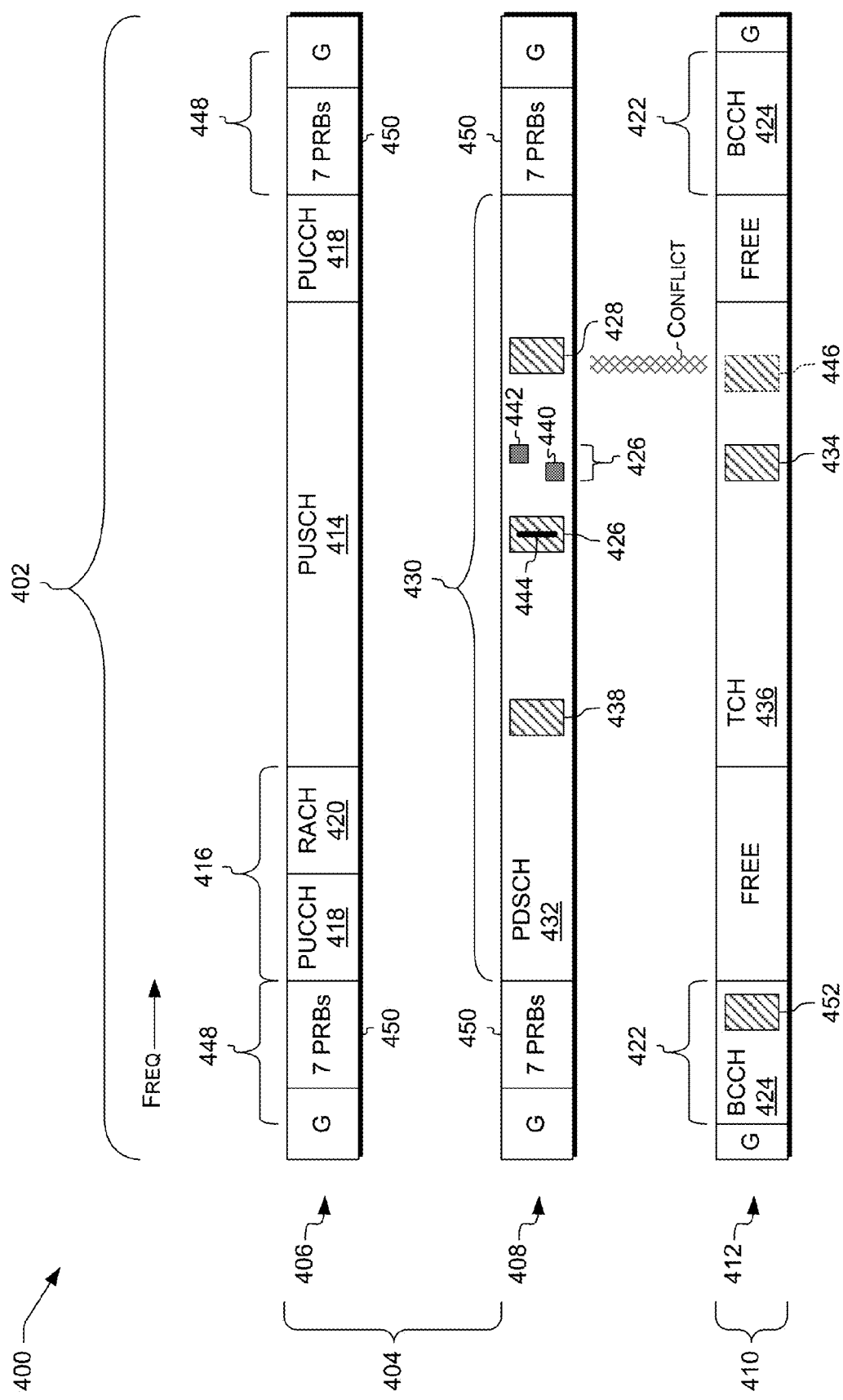
FIG. 4 shows an example band layout for overlaid operation of two networks of different types within a single frequency band.

FIG. 4 shows an example band layout 400 for operation of both a first network having a first type and a second network having a second, different type within a single, common band 402. The illustrated example shows the first type being an LTE type and the second type being a GSM type, but other network types or combinations of network types can be used. Moreover, two separate networks of the same type can be overlaid in a band using techniques herein.

Illustrated are, for the first network 404, LTE uplink plan 406 and LTE downlink plan 408; and for the second network 410, GSM uplink/downlink plan 412. In the plans, "G" denotes a guard band and "FREE" denotes space unused in that plan. In plan 406, the uplink includes a physical uplink shared channel (PUSCH) 414 carrying, e.g., call setup signaling, user data, and control signaling data.

In the illustrated example, plans 406, 408, and 412 are shown as overlapping within band 402. In some examples, uplink and downlink bands are separate, paired bands. For example, LTE band 12 places uplink between 698 MHz and 716 MHz, and downlink between 728 MHz and 746 MHz. Some examples herein can be used with any combination of single bands (e.g., for LTE TDD) or paired bands (e.g., Band 12 or other LTE FDD bands). As such, nothing in the illustrated configuration limits the width or configuration (single/paired) of bands that can be used with example techniques herein.

In the illustrated example, a radio access provider such as radio access provider 302, FIG. 3, can receive control information of first network 404 in a first frequency sub-band 416. In the illustrated example of an LTE first network 404, radio access provider 302 can receive the control information via a PUCCH 418 or a random-access channel (RACH) 420. In the illustrated example, PUCCH 418 includes two portions spaced apart in frequency. In some examples, second frequency sub-band 422 is arranged closer to the center of band 402 than first frequency sub-band 416.

In the illustrated example, radio access provider 302 can transmit control information of second network 410, in a second frequency sub-band 422 different from the first frequency sub-band 416. In the illustrated example of a GSM second network 410, radio access provider 302 can transmit the control information via a BCCH 424. In some examples, the sub-bands can include multiple connected or disjoint sections. In the illustrated example, second frequency sub-band 422 includes two disjoint sections, one towards the low-frequency end of band 402 and one towards the high-frequency end of band 402.

In the illustrated example, radio access provider 302 can transmit media information of the first network via a first first-network channel 426 and a second first-network channel 428. The media information can include, e.g., data of voice or video sessions, SMS messages, or other PS or CS transmissions, e.g., of user-provided content of a session. The channels 426 and 428 can be spaced apart in frequency within a third frequency sub-band 430. In the illustrated example of an LTE first network 404, radio access provider 302 can transmit the media information via a physical downlink shared channel (PDSCH) 432. The specific illustrated locations of channels 426 and 428 are for purposes of explanation and are not limiting. In some examples, the third frequency sub-band 430 can be disjoint from, i.e., can be non-overlapping with, the second frequency sub-band 422.

In the illustrated example, radio access provider 302 can transmit media information of the second network via a second-network channel 434. Second-network channel 434 can be arranged in frequency between the first and second first-network channels within the third frequency sub-band 430. In the illustrated example of a GSM second network 410, radio access provider 302 can transmit the media information via a traffic channel (TCH) 436. The specific illustrated location of channel 434 is for purposes of explanation and is not limiting. In some examples, allocator 316, e.g., baseband 238, can limit the total bandwidth allocation of the second network to a specific value, e.g., 600 kHz spread across a 10 MHz band.

In this example, scheduler 304 can assign LTE PRBs corresponding to first-network channels 426 and 428 to LTE transmissions from radio access provider 302, e.g., an LTE eNodeB 110. Scheduler 304 can block, or leave unassigned, LTE PRBs corresponding to second-network channel 434. This can permit the first network and the second network to operate simultaneously in a single band 402 without interference.

In the illustrated example, radio access provider 302 can transmit media information of the first network via a third first-network channel 438. The third first-network channel 438 can be arranged within the third frequency sub-band 430 and can be different from the first and second first-network channels 426, 428. For example, radio access provider 302 can perform frequency hopping, e.g., as specified by the LTE standards. This can improve resistance to multipath fading and other frequency-dependent losses, improving signal-to-noise ratio (SNR) or capacity.

In some examples, radio access provider 302 can transmit reference signals within at least plans 408 or 412. In the illustrated example, radio access provider 302 transmits two LTE reference symbols 440 and 442 in the third frequency sub-band 430 (e.g., including PDSCH 432). In the illustrated example, reference symbols 440 and 442 overlap in frequency with second-network channel 434. Therefore, reference symbols 440 and 442 may appear as noise or other interference with transmissions in second-network channel 434. In some examples, as discussed below, radio access provider 302 can reduce the transmission power of reference symbols 440 or 442. This can provide improved performance of second network 410, e.g., a reduced dropped-call rate of second network 410.

In some examples, the first-network channels 426, 428, or 438, or the second-network channel 434, can include (or correspond to, or be represented or defined by, and likewise throughout) respective carriers or subcarriers. For example, in an LTE network, subcarriers are spaced 15 kHz apart. First first-network channel 426 can therefore include, e.g., a first subcarrier frequency 444±7.5 kHz. In another example of LTE, the first-network channels 426, 428, or 438 can include respective resource blocks, each resource block including twelve adjacent sub channel s.

In some examples, a second second-network channel 446 at least partly overlaps in frequency with second first-network channel 428. The overlap is graphically represented by the crosshatched bar between plans 408 and 412. As used herein, a "conflict channel" is a channel at least partly overlapping in frequency with another channel. In this example, second first-network channel 428 is a conflict channel. In some examples, as discussed below, radio access provider 302 can discontinue use of the conflict channel, e.g., second first-network channel 428. This can permit maintaining signal quality and usability of the second network corresponding to plan 412.

In the illustrated example, a fourth frequency sub-band 448 of the first network overlaps at least partly with second frequency sub-band 422 of the second network, e.g., used for transmitting control information of the second network. In the illustrated example, fourth frequency sub-band 448 includes seven physical resource blocks 450 ("7 PRBs") in at least LTE uplink plan 406 or LTE downlink plan 408. In some examples, radio access provider 302 can assign fourth frequency sub-band 448 in plans 406 or 408 as a selective-use sub-band. For example, as described below, radio access provider 302 can use fourth frequency sub-band 448 in time or frequency slots not occupied by transmissions in second frequency sub-band 422.

In some examples, bandwidth allocated for the control channel can also be used for data transmissions. For example, in a GSM network, the BCCH 424 in second frequency sub-band 422 can carry media as well as control information. In some examples, the second-network channel is located in the second frequency sub-band 422, as graphically represented by second-network channel 452. In situations having low traffic on the second network, e.g., low GSM traffic, TCH 436 or a corresponding allocation in third frequency sub-band 430 for the second network can be disabled to permit the first network to use the third frequency sub-band 430 without interference from the second network.

In some examples, radio access provider 302 can adjust channel allocations based on utilization. For example, radio access provider 302 can allocate more channels (e.g., LTE PRBs) to the first network when the first network is more heavily loaded than the second network, and allocate more channels to the second network when the second network is more heavily loaded than the first network.

Figure 5:
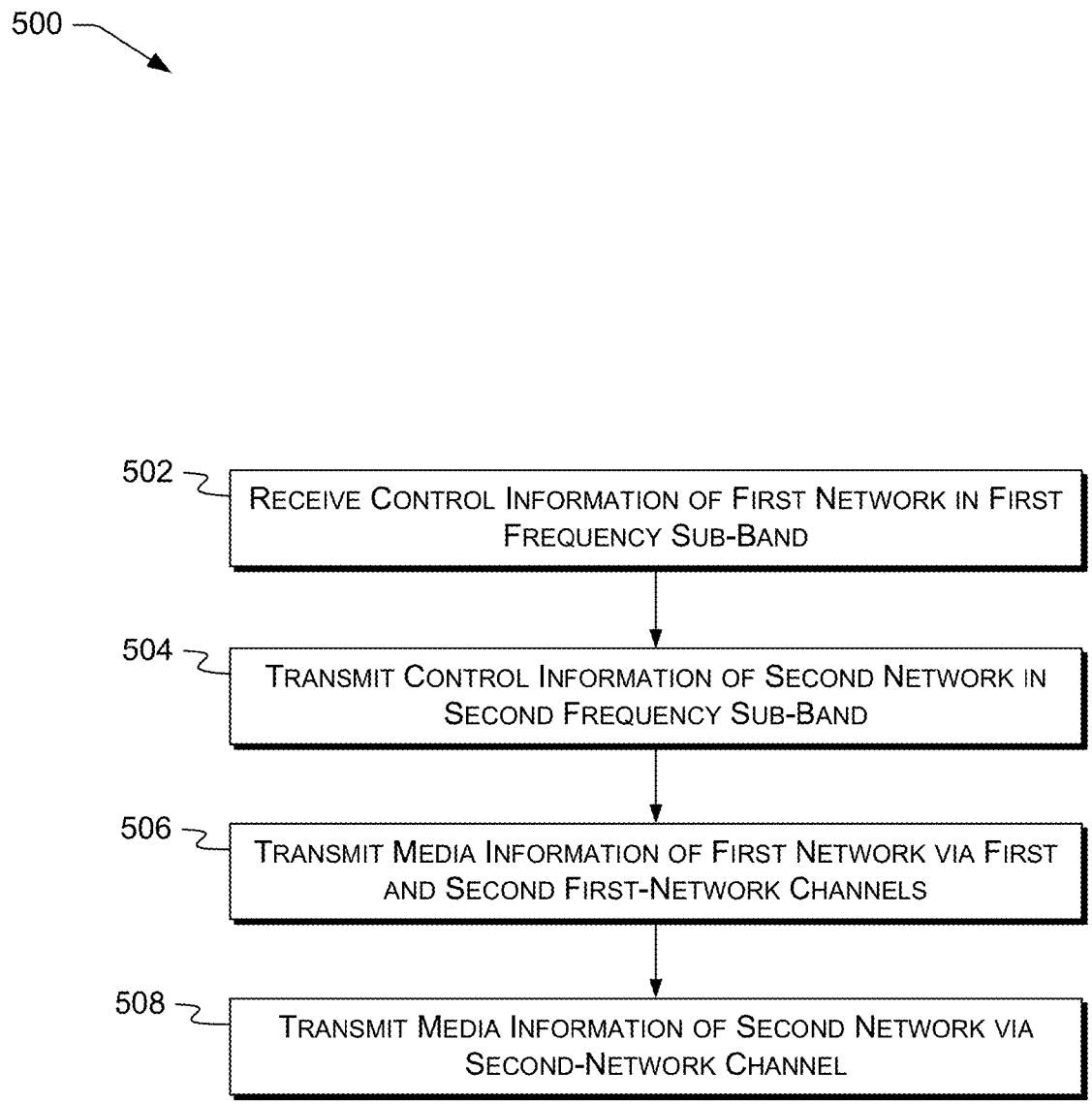
FIG. 5 illustrates an example process for controlling communication sessions on multiple networks, e.g., overlaid networks, according to some implementations.

FIG. 5 illustrates an example process 500 for controlling communication sessions on multiple networks, e.g., overlaid networks. Process 500, and likewise processes shown in FIGS. 6-10, can be performed, e.g., by a radio access provider, e.g., radio access provider 204 or 302, communicatively connectable with wireless communication devices, e.g., wireless communication device 202, of a telecommunications network 100. In some examples, the radio access provider 302 includes one or more processors (e.g., processor 228) configured to perform operations described below, e.g., in response to computer program instructions of the first-network module 232, the second-network module 234, the scheduler 236, or the baseband 238. Operations shown in FIGS. 5-10, discussed below, can be performed in any order except when otherwise specified, or when data from an earlier step is used in a later step. For clarity of explanation, reference is herein made to various components shown in FIGS. 1-3 that can carry out or participate in the steps of the exemplary method, and to various channels, bands, and plans shown in FIG. 4. It should be noted, however, that other components can be used; that is, exemplary method(s) shown in FIGS. 5-10 are not limited to being carried out by the identified components, and are not limited to using the identified channels, bands, plans, or network types.

At 502, the radio access provider 204 can receive, in a first frequency sub-band 416, control information of a first network having a first type. For example, the first type can be an LTE type. In an example, the radio access provider 204 receives the control information in a PUCCH 418 or an RACH 420.

At 504, the radio access provider 204 can transmit, in a second, different frequency sub-band 422, control information of a second network having a second, different type. For example, the second type can be a GSM type. In an example, the radio access provider 204 transmits the control information in a BCCH 424.

In some examples, radio access provider 204 can assign the first frequency sub-band 416 or the second frequency sub-band 422 using overdimensioning, e.g., PUCCH 418 overdimensioning. Overdimensioning can include allocating first-network uplink control channels, e.g., PUCCH 418 or RACH 420, towards the center of band 402 or away from the edges of band 402 to avoid overlap with the spectrum allocated to second-network control channels such as the GSM BCCH 424. This can reduce uplink interference between the first and second networks. In the example of FIG. 4, PUCCH 418 is placed in band 402 to avoid any overlap with BCCH 424. In other examples, PUCCH 418 can be placed in band 402 to overlap partially with BCCH 424. In the LTE example of FIG. 4, the size of PUSCH 414 is reduced as PUCCH 418 is further overdimensioned (moved closer to the center of band 402). In some examples, the number of LTE physical resource blocks allowed on PUSCH 414 for each UE can be adjusted to balance bandwidth usage and performance of the LTE network.

In some examples, overdimensioning can permit increased cellular service range. For example, where Additional Maximum Power Reduction (A-MPR) restrictions apply, wireless communication device 202 is required to reduce the output power at the band edges to reduce interference in neighboring frequency bands. Moving PUCCH 418 away from edges of band 402, and thus away from neighboring bands, permits increasing transmit power of PUCCH 418 signals at the wireless communication device 202. This can increase the range at which radio access provider 204 can detect the wireless communication device 202, and thus increase the service area.

In some examples, radio access provider 204 can assign at least the first frequency sub-band 416, the second frequency sub-band 422, or the third frequency sub-band 430 using blocking, e.g., of PUSCH 414 or PDSCH 432 with respect to the control information of the second network. For example, radio access provider 204 can assign frequencies to avoid, e.g., allocation of LTE PRBs to PUSCH 414 and PDSCH 432 in sub-bands used by, e.g., the GSM BCCH 424. This can reduce interference to the second network and can reduce the dropped-call rate (DCR) on the second network. In some examples, blocking can further include deactivating inter-cell interference coordination (ICIC) or other forms of coordination between two radio access providers 204 serving nearby areas in the first-network uplink and downlink. This can permit radio access provider 204 to individually determine which channels it uses, and therefore to separate first- and second-network control information in the frequency domain.

In some examples, at 502, before receiving the control information of the first network, radio access provider 204 can allocate the control information of the first network to a particular sub-band. For example, radio access provider 204 can overdimension, block, or adjust the number of uplink channels (e.g., PUCCHs 418) available for use by the first network.

In some examples, at 504, radio access provider 204 can additionally or alternatively receive media information of the second network in the second frequency sub-band 422. For example, receiving first-network control information in first frequency sub-band 416, and receiving second-network media information in second, different frequency sub-band 422, can reduce or prevent interference between the first-network control information and the second-network media information. In some examples, such as a paired configuration similar to that shown in FIG. 4, uplink traffic can be separated in frequency from downlink traffic for the first network, the second network, or both. In some of these examples, allocator 316 can assign channels to reduce interference at least between first-network uplink and second-network uplink, or between first-network downlink and second-network downlink.

At 506, radio access provider 204 can transmit media information of the first network via first and second first-network channels 426 or 428 spaced apart in frequency within a third frequency sub-band 430. For example, radio access provider 204 can transmit the media information via a PDSCH 432. In some examples, e.g., as discussed above with reference to FIG. 4, the third frequency sub-band 430 can be disjoint from the second frequency sub-band 422. This can provide improved robustness against call drops on the second network.

In some examples, at 506, before transmitting the media information of the first network, radio access provider 204 can assign channels 426, 428, or 434, e.g., using random start point scheduling or frequency-selective scheduling. Examples of these techniques are discussed below with reference to FIG. 6. Frequency-selective scheduling can be performed, e.g., as described in 3GPP TS 36.101 v11.0.0 (2012 March), §9.3.

At 508, radio access provider 204 can transmit media information of the second network via a second-network channel 434 arranged in frequency between the first and second first-network channels 426 and 428 within the third frequency sub-band 430. For example, radio access provider 204 can transmit the media information via a TCH 436.

In some examples, first-network transmissions or receptions such as those described herein with reference to blocks 502 or 506 can employ Interference Rejection Combining (IRC). IRC can include determining correlations in the spatial domain (e.g., between antennas) or in the frequency domain to suppress interfering signals from other cells or in-band external interferers. Using IRC can increase first-network capacity, e.g., by suppressing undesirable inter-cell interference in uplink. IRC can be performed, e.g., as described in 3GPP TR 36.829 v11.0.0 (2012 March).

Figure 6:
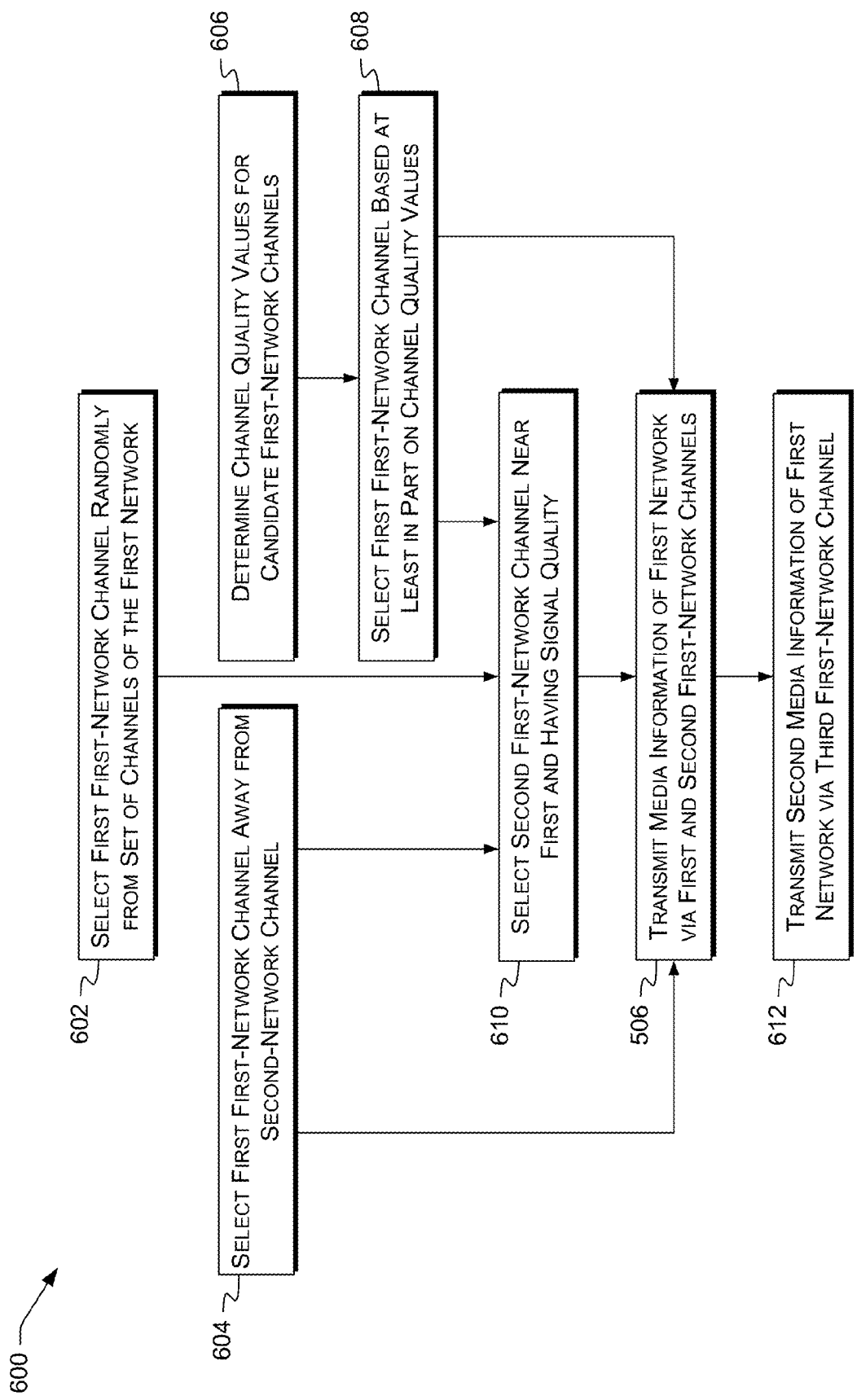
FIG. 6 illustrates an example process for controlling communication sessions on multiple networks, e.g., overlaid networks, according to some implementations.

FIG. 6 illustrates an example process 600 for controlling communication sessions performed, e.g., by the radio access provider 204 or 302. Block 506 can be as discussed above with reference to FIG. 5. Block 506 can follow at least blocks 602, 604, 606, 608, 610. Block 506 can be followed by block 612. Blocks 604, 608, or 610 can be followed by block 506. In some examples (omitted for brevity), any of the following can be performed independently of the others: block 602, block 604, the group of blocks 606 and 608, or block 610.

At 602, radio access provider 204 can select the first first-network channel 426 randomly (or pseudorandomly, and likewise throughout) from a plurality of candidate channels of the first network. For example, radio access provider 204 can use random start point frequency scheduling to choose from among the candidate channels. The candidate channels can include, e.g., LTE PRBs in or spread throughout the PDSCH 432.

At 604, radio access provider 204 can select, as the first first-network channel 426, one of a plurality of candidate channels most different in frequency from the second-network channel 434. In some examples, channels of the first network and the second network can be spread throughout the third frequency sub-band 430, e.g., PDSCH 432 and TCHes 436. Channels of the first network and the second network can be interspersed or grouped. Selecting the first first-network channel 426 as in block 604 can provide separation between first-network users and second-network users, permitting wider channels to be used without interference. Selecting channels 426 or 428 away from second sub-band 422, e.g., using blocking as described above, can reduce interference by the first network in the second network. In some examples, scheduler 236 can be configured to select first-network channels such as first first-network channel 426 preferentially near one end of a frequency band or sub-band, and baseband 238 can be configured to select second-network channels such as second-network channel 434 preferentially near an opposite end of the frequency band or sub-band. For example, in FIG. 4, scheduler 236 can select first-network channels from available channels near the low-frequency (left) end of third sub-band 430, using higher-frequency channels only when lower-frequency channels are occupied or otherwise unavailable. Similarly, baseband 238 can select second-network channels from available channels near the high-frequency (right) end of third sub-band 430, using lower-frequency channels only when higher-frequency channels are occupied or otherwise unavailable. This can reduce the probability of interference or conflict between first-network channels and second-network channels.

At 606, radio access provider 204 can determine respective channel quality values for individual candidate first-network channels based at least in part on second-network usage data of the candidate first-network channels. In some examples, block 606 can include receiving a device-specific channel quality value from a wireless communication device of the first network, e.g., as described above with reference to FIG. 3. Block 606 can further include determining at least one of the channel quality values further based on the device-specific channel quality value. Block 606 can be followed by block 608.

At 608, radio access provider 204 can select the first first-network channel from the candidate first-network channels based at least in part on the channel quality values. For example, frequency-selective scheduling can be performed as described herein. Channels that have second-network transmissions can have lower signal-quality values from the standpoint of the first network, so selecting the first first-network channel based at least in part on the channel quality values can assign first-network channels away from second-network channels already in use, reducing interference between the first and second networks.

At 610, radio access provider 204 can select, as the second first-network channel, one of a plurality of candidate channels closest to the first first-network channel and having a signal-quality value meeting a selected criterion. The signal-quality value can include, e.g., an SNR or a CQI. For example, radio access provider 204 can select first-network channels moving away from the first first-network channel

426, higher or lower in frequency, or symmetrically in frequency, selecting channels that have sufficient signal quality. This can maintain first-network transmissions nearby in frequency space, reducing fragmentation of the allocations while still providing space for second-network transmissions.

At 612, radio access provider 204 can, after transmitting the media information of the first network via the first and second first-network channels, transmit second media information of the first network via a third first-network channel within the third frequency sub-band different from the first and second first-network channels. For example, LTE frequency hopping can be performed to reduce packet loss due to multipath fading.

Figure 7:
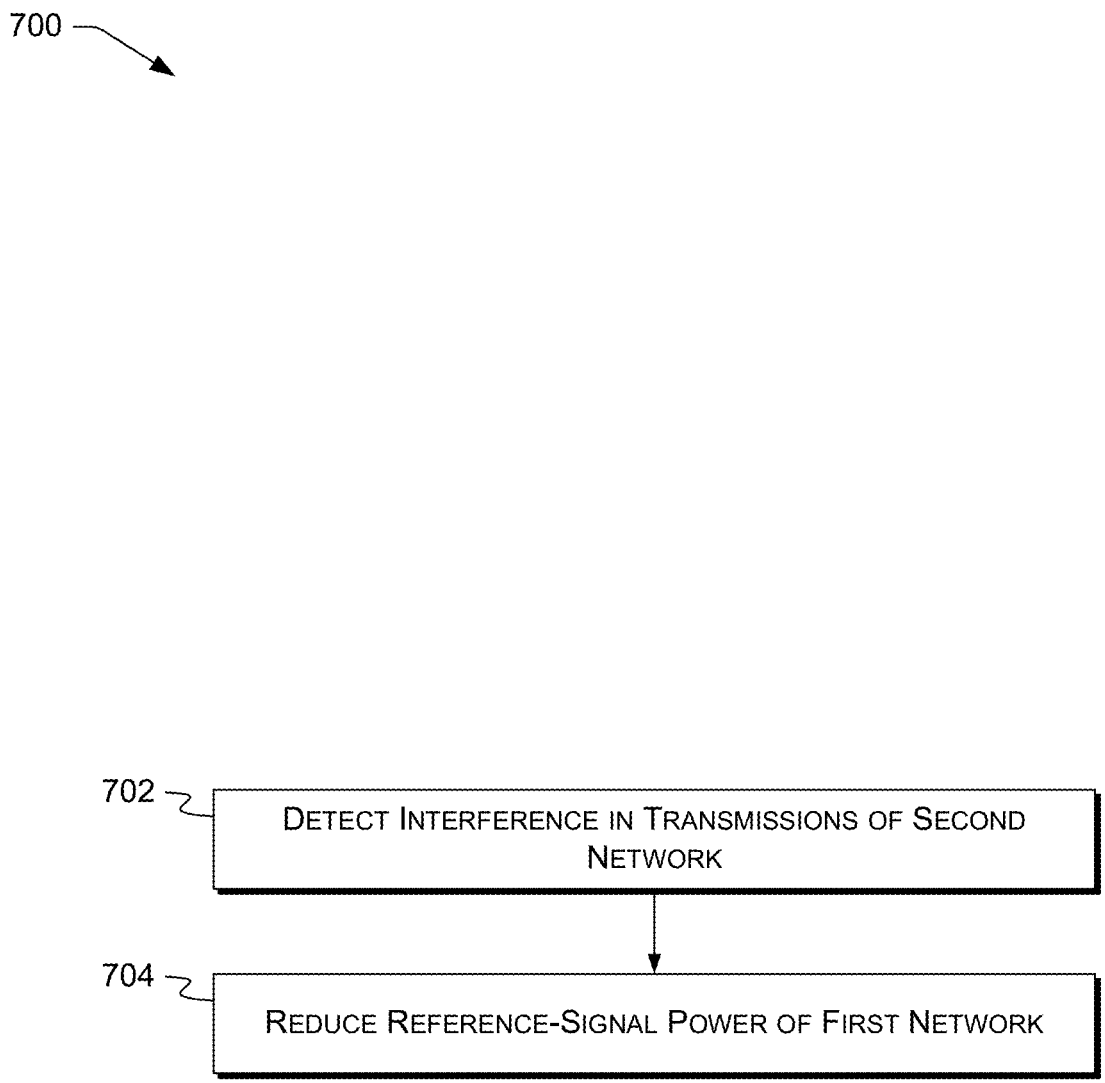
FIG. 7 illustrates an example process for controlling communication sessions on multiple networks, e.g., overlaid networks, according to some implementations.

FIG. 7 illustrates an example process 700 for controlling communication sessions on multiple networks performed, e.g., by radio access provider 204 or 302. Blocks 702 and 704 can be executed at any time during the execution of processes 500 or 600.

At 702, radio access provider 204 can detect interference in transmissions of the second network. The interference can be, e.g., in uplink or downlink. For example, transmissions of the first network can be interference in transmissions of the second network. Radio access provider 204 can detect interference by measuring channels of the second network or by comparing data of assigned first-network channels to data of available or assigned second-network channels.

At 704, radio access provider 204 can, in response to interference detected in block 702, reduce a reference-signal power of the first network. For example, LTE networks transmit reference symbols in a pattern throughout LTE transmission times. The transmit power of these reference symbols can be reduced. This can, in turn, reduce the DCR on the second network.

Figure 8:
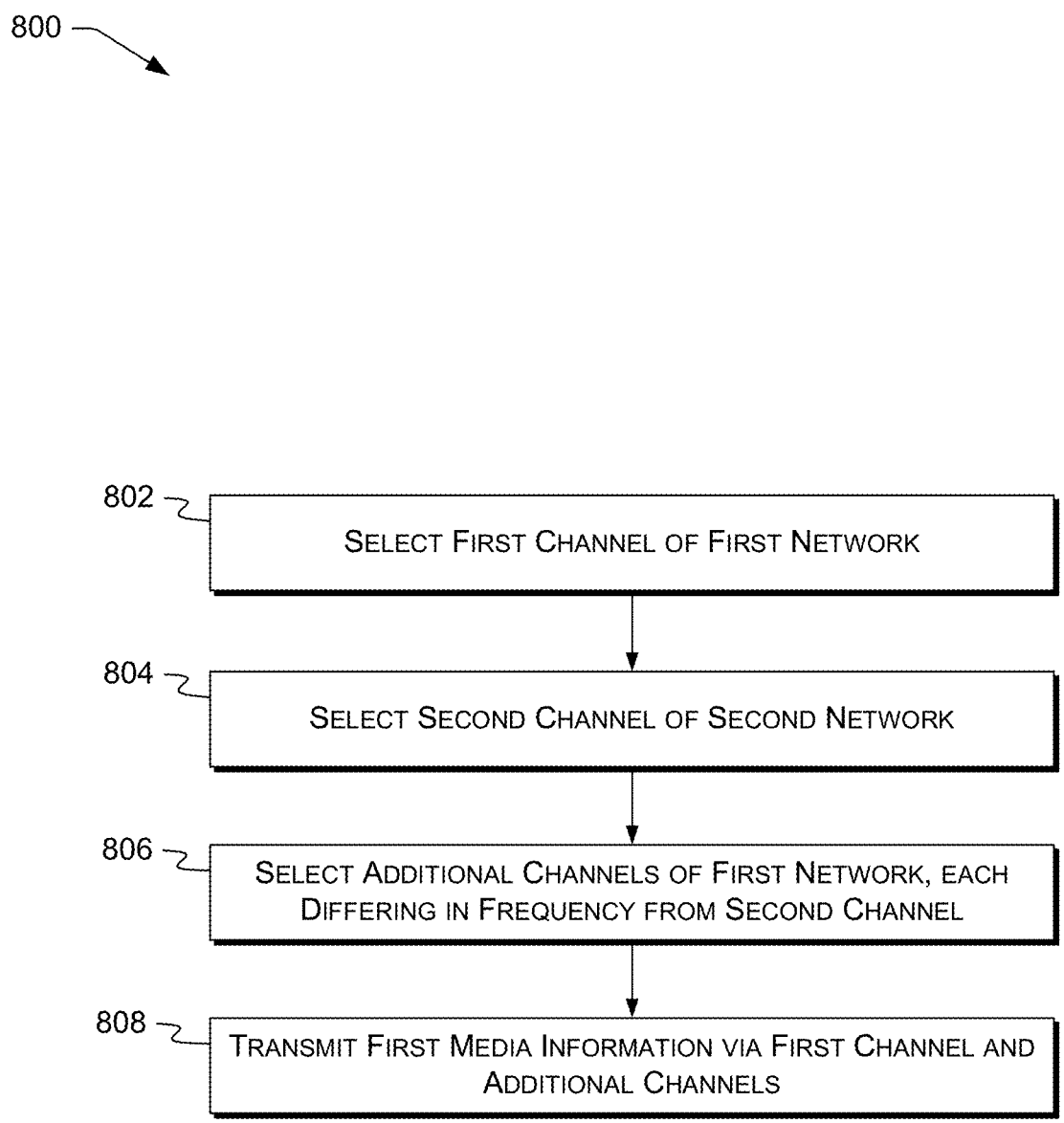
FIG. 8 illustrates an example process for controlling communication sessions on multiple networks, e.g., overlaid networks, according to some implementations.

FIG. 8 illustrates an example process 800 for controlling communication sessions on multiple networks performed, e.g., by radio access provider 204 or 302.

At 802, radio access provider 204 can select a first channel of a first network of a first type, e.g., an LTE network, for first media information. For example, the channel can be selected randomly, e.g., as discussed above with reference to block 602.

In some examples, at 602, 604, or 802, radio access provider 204 can select the first channel of the first network as a lowest-frequency candidate channel or a highest-frequency candidate channel. This can leave room in the middle of the third frequency sub-band 430 for second-network channels.

At 804, radio access provider 204 can select a second channel of a second network of a second type, e.g., a GSM network, for second media information. For example, the second channel can be disjoint in frequency from the first channel.

In some examples, at 804, radio access provider 204 can select the first channel and the second channel according to whether or not paired bands are in use. In a paired-band configuration, uplink and downlink can be separated by the pairing. In some examples, as discussed above with reference to block 504, radio access provider 204 can select the first channel and the second channel to reduce interference at least between first-network uplink and second-network uplink, or between first-network downlink and second-network downlink.

At 806, radio access provider 204 can select one or more additional channels of the first network for the first media information. Each of the additional channels can be different in frequency from the second channel. Radio access provider 204 can select additional channel(s) using techniques described herein for selecting first first-network channel 426 or second first-network channel 428.

In some examples, at 802 or 806, radio access provider 204 can select first-network channels using frequency-selective scheduling. For example, channels can be selected that have channel quality values indicating they are available. In some examples, channels having noise below a selected threshold, or SNR above a selected threshold, can be selected. In some examples, thresholds for noise or SNR can be adjusted depending on load. For example, the noise threshold may be increased, or the SNR threshold decreased, as second-network utilization increases. In some examples, channels not in use by the second network can be selected, or channels not in use by the second network can be selected only when first-network utilization rises above a selected threshold. These and other examples can permit maintaining performance of the first network simultaneously with maintaining functionality of the second network.

At 808, radio access provider 204, e.g., under control of first-network module 232, can operate a first transceiver to wirelessly transmit the first media information via the first channel and the one or more additional channels.

In the examples described herein, including examples described with reference to FIGS. 5-10, unless otherwise specified, individual items, e.g., physical items or data items, can be provided or operated on by any combination of the described operations. For example, block 808 can be performed with respect to all of the one or more additional channels provided by block 806, or with respect to fewer than all of the one or more additional channels provided by block 806. Similarly, any operation described herein can produce data not consumed by a subsequent operation.

Figure 9:
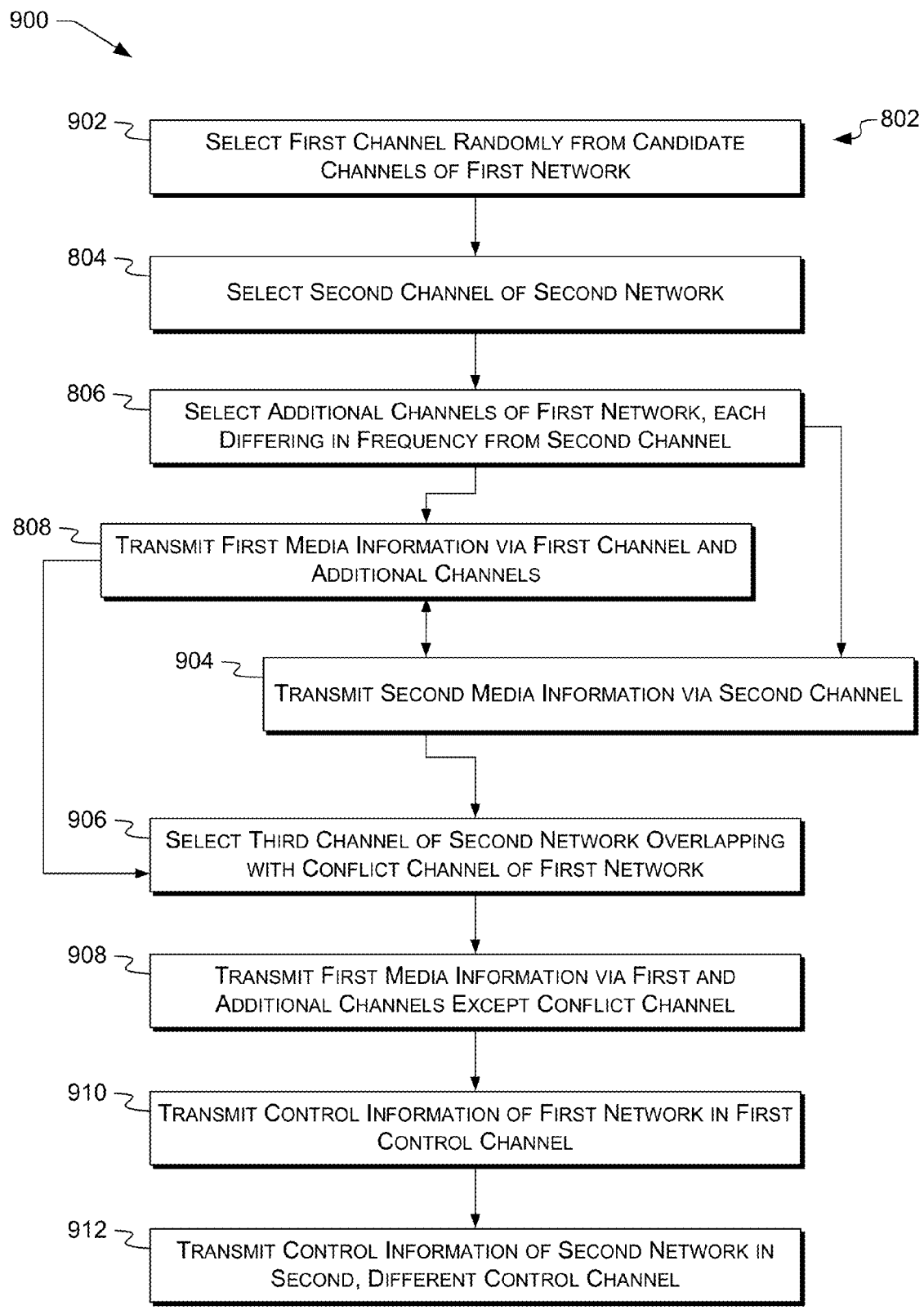
FIG. 9 illustrates an example process for controlling communication sessions on multiple networks, e.g., overlaid networks, according to some implementations.

FIG. 9 illustrates an example process 900 for controlling communication sessions on multiple networks performed, e.g., by radio access provider 204 or 302. Blocks 802, 804, 806, and 808 can be as described above with reference to FIG. 8.

At 902, radio access provider 204, e.g., under control of allocator 316, can select the first channel randomly from a plurality of candidate channels of the first network. This can be done, e.g., as described above with reference to block 602. Block 902 can be an example of block 802.

At 904, radio access provider 204, e.g., under control of second-network module 234, can operate a second transceiver different from the first transceiver to wirelessly transmit the second media information via the second channel. As indicated by the arrows, transmissions directed by block 904 can be performed before, after, or in parallel with (e.g., simultaneously or time-interleaved with) transmissions directed by block 808.

At 906, radio access provider 204 can select a third channel of the second network, the third channel different in frequency from the second channel and at least partly overlapping in frequency with a conflict channel of the additional channels. For example, as GSM utilization increases, overlapping channels can be selected to maintain performance of the GSM network. Block 906 can be followed by block 908.

At 908, radio access provider 204, e.g., under control of first-network module 232, can operate the first transceiver to wirelessly transmit the first media information via the first channel and the one or more additional channels except for the conflict channel. In this way, functionality of the first network can be maintained even as second-network utilization rises.

At 910, radio access provider 204 can transmit, in a first control channel, control information of the first network. Block 910 can follow block 808, 904, or 906; those arrows are omitted for brevity. Block 910 can be followed by block 912.

At 912, radio access provider 204 can receive, in a second control channel different from the first control channel, control information of the second network. For example, the control channels can be selected using overdimensioning as described above.

Figure 10:
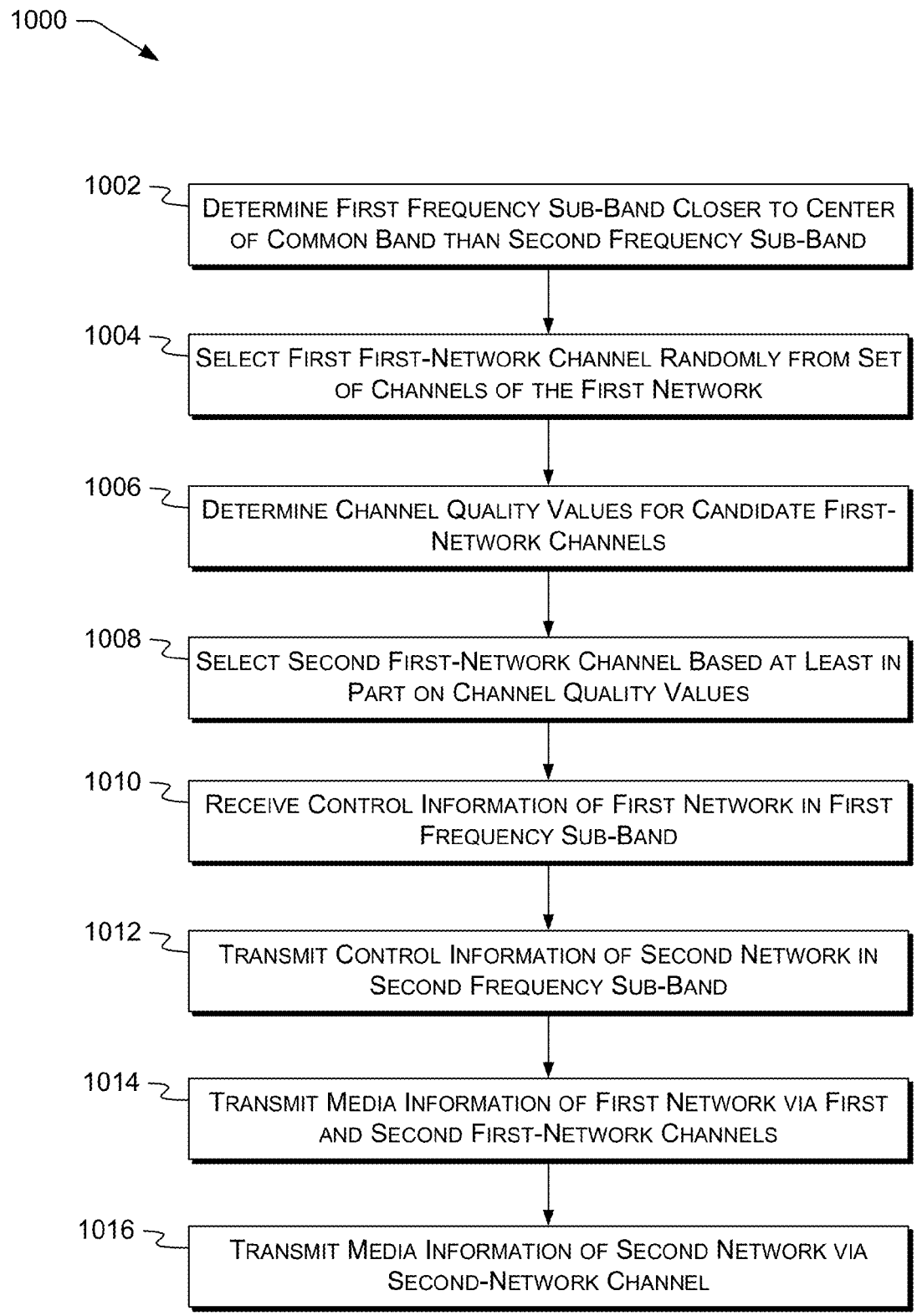
FIG. 10 illustrates an example process for allocating channels or controlling communication sessions on multiple networks, e.g., overlaid networks, according to some implementations.

FIG. 10 illustrates an example process 1000 for controlling communication sessions on multiple networks performed, e.g., by radio access provider 204 or 302. In some examples, radio access provider 204 can include a first radio and a second, different radio. The first radio and the second radio can be tuned to operate within a common frequency band. One or more antennas can be connected to at least the first radio or the second radio. A processor 228 of radio access provider 204 can be communicatively connected with the first radio and the second radio and configured to perform operations described herein.

At 1002, radio access provider 204 can determine a first frequency sub-band 416 closer to the center of a common band 402 than a different second frequency sub-band 422. This can be done, e.g., as described above with reference to overdimensioning.

At 1004, radio access provider 204 can select a first first-network channel 426 randomly from a plurality of candidate channels of the first network. This can be done, e.g., as described above with reference to block 602.

At 1006, radio access provider 204 can determine respective channel quality values for individual candidate first-network channels based at least in part on second-network usage data of the candidate first-network channels. This can be done, e.g., as discussed above with reference to block 606.

At 1008, radio access provider 204 can select a second first-network channel 428 from the candidate first-network channels based at least in part on the channel quality values. This can be done, e.g., as discussed above with reference to block 608. Any technique herein for selecting a first first-network channel 426 can additionally or alternatively be used for selecting a second first-network channel 428.

At 1010, radio access provider 204 can receive, via the first radio and in the first frequency sub-band 416, control information of a first network having a first type. This can be done, e.g., as discussed above with reference to block 502.

At 1012, radio access provider 204 can transmit, via the second radio and in the second frequency sub-band 422, control information of a second network having a second, different type. This can be done, e.g., as discussed above with reference to block 504.

At 1014, radio access provider 204 can transmit, via the first radio, media information of the first network via the first and second first-network channels 426 and 428 spaced apart in frequency within a third frequency sub-band 430. This can be done, e.g., as discussed above with reference to block 506.

At 1016, radio access provider 204 can transmit, via the second radio, media information of the second network via a second-network channel 434 arranged in frequency between the first and second first-network channels 426 and 428 within the third frequency sub-band 430. This can be done, e.g., as discussed above with reference to block 508.

Illustrative Results

An experiment was conducted using an LTE/GSM system operating in the 1900 MHz band with 10 MHz uplink bandwidth and 10 MHz downlink bandwidth. The LTE and GSM networks were overlaid. Frequency-selective scheduling, PUCCH over-dimensioning, and random start point frequency scheduling were used as described above, and the GSM network was allocated only BCCHs and no TCHs. LTE user throughout increased by ~3 Mbps, while GSM DCR was comparable to the DCR before overlaying the networks. A second, similar experiment in a different city showed comparable improvement in LTE user throughput.

CONCLUSION

Various aspects described above permit allocating channels, blocks, sub-bands, or other units of wireless transmission capacity to two or more different networks operating in a common frequency band. In some examples, LTE and GSM operations are overlapped within a single band. As discussed above, technical effects of various examples can include increasing bandwidth utilization of a band and reducing the number of bands required to provide service to a particular set of wireless network devices. Technical effects of using a single band can include reducing the power requirements and increasing the efficiency of the RF subsystem in a wireless communication device, which can in turn reduce power draw or increase battery life of that device.

Example data transmissions or channels in FIG. 4 and example blocks in the process diagrams of FIGS. 5-10 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A radio access provider, comprising:
one or more processing unit(s);
and one or more computer-readable media having thereon instructions executable to cause the processing unit(s) to perform operations comprising:
receiving, in a first frequency sub-band, control information of a first network having a first type;
transmitting, in a second, different frequency sub-band, control information of a second network having a second, different type;
determining respective channel quality values for individual candidate first-network channels of a plurality of candidate first-network channels based at least in part on second-network usage data of the candidate first-network channels;
selecting a first first-network channel from the candidate first-network channels based at least in part on the channel quality values;
transmitting media information of the first network via the first first-network channel and a second first-network channel, wherein the first and second first-network channels are spaced apart in frequency within a third frequency sub-band; and
transmitting media information of the second network via a second-network channel arranged in frequency between the first and second first-network channels within the third frequency sub-band,
so that the first network having the first type and the second network having the second, different type can operate within a single, common band.

2. The radio access provider according to claim 1, wherein the operations further comprise:
selecting the second first-network channel randomly from a plurality of candidate channels of the first network.

3. The radio access provider according to claim 1, wherein the operations further comprise:
selecting, as the second first-network channel, one of a plurality of candidate channels closest to the first first-network channel and having a signal-quality value meeting a selected criterion.

4. The radio access provider according to claim 1, wherein the operations further comprise:
selecting, as the second first-network channel, one of a plurality of candidate channels most different in frequency from the first-network channel.

5. The radio access provider according to claim 1, wherein the operations further comprise:
receiving a device-specific channel quality value from a wireless communication device of the first network; and
determining at least one of the channel quality values further based on the device-specific channel quality value.

6. The radio access provider according to claim 1, wherein the operations further comprise:
after transmitting the media information of the first network via the first and second first-network channels, transmitting second media information of the first network via a third first-network channel, the channel being within the third frequency sub-band and different from the first and second first-network channels.

7. The radio access provider according to claim 1, wherein the operations further comprise:
detecting interference in transmissions of the second network; and
in response, reducing a reference-signal power of the first network.

8. The radio access provider according to claim 1, wherein the third frequency sub-band is disjoint from the second frequency sub-band.

9. The radio access provider according to claim 1, wherein the first type is an LTE type and the second type is a GSM type.

10. The radio access provider according to claim 1, wherein: the radio access provider further comprises a first transceiver and a second transceiver; and
the operations further comprise:
transmitting the media information of the first network using the first transceiver; and
transmitting the media information of the second network via the second transceiver.

11. The radio access provider according to claim 1, wherein the operations further comprise:
determining a plurality of first-network channels comprising the first first-network channel and the second first-network channel;
selecting an additional second-network channel, the additional second-network channel different in frequency from the second-network channel and at least partly overlapping in frequency with the second first-network channel; and
transmitting second media information of the first network via the plurality of first-network channels except for the second first-network channel.

12. A radio access provider, comprising:
a first radio and a second, different radio, wherein the first radio and the second radio are tuned to operate within a common frequency band;
one or more antennas connected to at least the first radio or the second radio; and
a processor communicatively connected with the first radio and the second radio and configured to perform operations comprising:
receiving, via the first radio and in a first frequency sub-band, control information of a first network having a first type;
transmitting, via the second radio and in a second, different frequency sub-band, control information of a second network having a second, different type;
determining respective channel quality values for individual candidate first-network channels of a plurality of candidate first-network channels based at least in part on second-network usage data of the candidate first-network channels;
selecting a first first-network channel from the candidate first-network channels based at least in part on the channel quality values; transmitting, via the first radio, media information of the first network via the first first-network channel and a second first-network channel, wherein the first and second first-network channels are spaced apart in frequency within a third frequency sub-band; and transmitting, via the second radio, media information of the second network via a second-network channel arranged in frequency between the first and second first-network channels within the third frequency sub-band, so that the first network having the first type and the second network having the second, different type can operate within a single, common band.

13. The radio access provider according to claim 12, wherein the operations further comprise:

selecting the second first-network channel randomly from a plurality of candidate channels of the first network.

14. The radio access provider according to claim 12, wherein the operations further comprise:

selecting, as the second first-network channel, one of a plurality of candidate channels most different in frequency from the second-network channel.

15. The radio access provider according to claim 12, wherein the operations further comprise:

after transmitting the media information of the first network via the first and second first-network channels, transmitting second media information of the first network via a third first-network channel within the third frequency sub-band different from the first and second first-network channels.

16. The radio access provider according to claim 12, wherein the operations further comprise:

determining the first frequency sub-band closer to the center of a common band than the second frequency sub-band.

17. The radio access provider according to claim 12, wherein the operations further comprise:

determining a plurality of first-network channels comprising the first first-network channel and the second first-network channel;

selecting an additional second-network channel, the additional second-network channel different in frequency from the second-network channel and at least partly overlapping in frequency with the second first-network channel; and transmitting second media information of the first network via the plurality of first-network channels except for the second first-network channel.

\* \* \* \* \*